US011334809B1

(12) United States Patent
Pasour et al.

(10) Patent No.: US 11,334,809 B1
(45) Date of Patent: May 17, 2022

(54) SYSTEM AND METHODS FOR INTERACTIVE TEXT REGRESSION MODEL BUILDING

(71) Applicant: SAS Institute Inc., Cary, NC (US)

(72) Inventors: Ernest C. Pasour, Cary, NC (US); Clayton A. Barker, Cary, NC (US); Paris Faison, Clayton, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/341,580

(22) Filed: Jun. 8, 2021

Related U.S. Application Data

(60) Provisional application No. 63/117,967, filed on Nov. 24, 2020, provisional application No. 63/109,570, filed on Nov. 4, 2020.

(51) Int. Cl.
*G06N 7/00* (2006.01)
*G06T 11/20* (2006.01)
*G06F 11/34* (2006.01)
*G06K 9/62* (2022.01)

(52) U.S. Cl.
CPC ......... *G06N 7/005* (2013.01); *G06F 11/3428* (2013.01); *G06K 9/6254* (2013.01); *G06T 11/206* (2013.01)

(58) Field of Classification Search
CPC .... G06N 7/005; G06T 11/206; G06K 9/6254; G06F 11/3428
See application file for complete search history.

(56) References Cited

U.S. PATENT DOCUMENTS

| | | | |
|---|---|---|---|
| 9,773,211 | B2 | 9/2017 | Barker |
| 10,963,788 | B1 | 3/2021 | Parker et al. |
| 10,970,651 | B1 | 4/2021 | Barker et al. |
| 2015/0331963 | A1* | 11/2015 | Barker .................. G06N 20/00 706/11 |
| 2018/0060469 | A1* | 3/2018 | Morgan .................. G06F 30/20 |

\* cited by examiner

*Primary Examiner* — Jianxun Yang
(74) *Attorney, Agent, or Firm* — Coats + Bennett, PLLC

(57) ABSTRACT

A computing system receives as candidate predictors, for a model set, a list of terms for computer identification in dataset(s). The system receives initial user selections in the graphical user interface (GUI) of a term set, a response variable, and target value(s) for the response variable. The term set comprises candidate predictors from the list. The response variable is for a response to input to an initial model of the model set. The system generates the initial model that estimates a relationship between the target value (s) and the term set. The system displays in the GUI a performance representation of the initial model for user comparison of models and an indication of a contribution, to the initial model, of terms of a subset of the term set. The system receives a subsequent user selection, in the GUI, to change an aspect of the initial model.

28 Claims, 33 Drawing Sheets
(12 of 33 Drawing Sheet(s) Filed in Color)

| event_city | event_state | damage | injury_level | narrative |
|---|---|---|---|---|
| Abilene | TX | Substantial | NONE | While on final approach to the runway, the pilot |
| Abilene | KS | Substantial | NONE | The airplane collided with trees and wires shortly |
| Ada | MN | Destroyed | NONE | The airplane impacted trees and terrain during a |
| Afton | VA | Destroyed | FATL | The pilot planned a direct flight from Leesburg, Vi |
| Afton | WY | Substantial | NONE | The pilot said he intentionally landed the airplane |
| Aiea | HI | Substantial | NONE | During a hovering passenger pickup, the helicopte |
| Aiken | TX | Substantial | NONE | The pilot was maneuvering the agricultural airpla |
| Ainsworth | NE | Destroyed | FATL | At 0705 CST, while attempting an approach to ru |
| Akiachak | AK | Substantial | NONE | The air taxi scheduled commuter pilot had six pas |
| AKIAK | AK | Substantial | NONE | The airplane was in cruise flight about 500 feet a |
| Akron | CO | Substantial | NONE | After monitoring ASOS (Automated Surface Obse |
| Akron | OH | Substantial | NONE | The pilot was landing on runway 23, a 7,597 foot |
| Alamogordo | NM | Destroyed | FATL | The two pilots had arrived from Europe 3 days be |
| Alamogordo | NM | Substantial | NONE | The pilot reported that shortly after an aero tow |
| Alamogordo | NM | Substantial | NONE | According to the CFI and the private pilot no anoi |
| Alamosa | CO | Substantial | NONE | The pilot stated that he had just passed over the |
| Albany | NY | None | NONE | The Dornier 328-300 experienced uncommanded |
| Albion | IL | Substantial | NONE | The pilot landed the airplane in the bean field aft |
| Albion | MI | Substantial | MINR | The pilot reported making several patterns in the |
| Albuquerque | NM | Substantial | NONE | The pilot said that while taxiing at night towards |
| Albuquerque | NM | Substantial | MINR | The pilot was approaching to land the balloon in |

*FIG. 15*

| Term | Coefficient | LogWorth | Count |
|---|---|---|---|
| wit· | 2.650 | 18.367 | 515 |
| locat· | 2.655 | 18.266 | 470 |
| instrument· | 2.674 | 11.967 | 262 |
| intend· | 2.741 | 8.034 | 152 |
| site· | 2.765 | 7.891 | 177 |
| lock· | 2.870 | 6.965 | 187 |
| main· rotor· | 2.920 | 3.203 | 173 |
| wit· report· | 3.134 | 8.405 | 172 |
| night· | 3.290 | 14.642 | 166 |
| radar | 3.905 | 15.299 | 212 |

Term Options
- Recode... — 2131
- Add Stop Word — 2132
- Add Stem Exception — 2133
- Remove — 2134
- Show Filter — 2135
- Make into Data Table — 2136
- Make Combined Data Table — 2137

| Term | Coefficient | LogWorth | Count |
|---|---|---|---|
| mountain· | 2.603 | 6.954 | 166 |
| wit· | 2.615 | 18.096 | 515 |
| lock· | 2.655 | 6.251 | 187 |
| day· | 2.668 | 19.717 | 300 |
| locat· | 2.841 | 21.901 | 470 |
| site· | 2.978 | 9.867 | 177 |
| instrument· | 3.027 | 17.074 | 262 |
| travel· | 3.060 | 10.665 | 151 |
| wit· report· | 3.412 | 8.388 | 172 |
| night· | 3.493 | 14.041 | 166 |

Summary

| Model | DTM Weighting | Response | Response Distribution | Estimation Method | Validation Method | Relevant Terms | AICc | BIC | Generalized RSquare | RASE |
|---|---|---|---|---|---|---|---|---|---|---|
| 1 | Binary | stars | Normal | Elastic Net | AICc | 250 | 6170.0 | 7567.2 | 0.622 | 0.780 |
| 2 | | stars | Normal | | AICc | | | | | |
| 3 | Frequency | stars | Normal | Lasso | AICc | 264 | 6314.7 | 7785.5 | 0.604 | 0.798 |
| 4 | TF IDF | stars | Normal | Lasso | AICc | 264 | 6314.7 | 7785.5 | 0.604 | 0.798 |

- 1 ▸ Generalized Regression for stars (Weighting=Binary, Model=Elastic Net/AICc) ✕
- 2 ▸ Generalized Regression for stars (Weighting=TF IDF, Model=Elastic Net/AICc) ✕
- 3 ▸ Generalized Regression for stars (Weighting=Frequency, Model=Lasso/AICc) ✕
- 4 ▸ Generalized Regression for stars (Weighting=TF IDF, Model=Lasso/AICc) ✕

| Term | Coefficient | LogWorth | Count |
|---|---|---|---|
| wast· | -1.124 | 6.149 | 31 |
| poor· | -0.898 | 7.168 | 43 |
| disgust· | -0.874 | 3.491 | 25 |
| disappoint· | -0.716 | 8.490 | 150 |
| custom | -0.633 | 2.234 | 47 |
| expens· | -0.629 | 5.108 | 75 |
| aw· | -0.625 | 2.393 | 24 |
| sad· | -0.590 | 1.985 | 26 |
| rude· | -0.554 | 3.739 | 73 |
| coaster | -0.408 | 3.630 | 30 |

*FIG. 29A*

| Document | Positive Contribution | Negative Contribution | Predicted | Actual |
|---|---|---|---|---|
| 2 | 0.051 | -0.418 | 3.993 | 1 |
| 3 | 0 | -0.339 | 4.021 | 5 |
| 4 | 0.174 | -0.768 | 3.766 | 5 |
| 5 | 0.075 | -1.164 | 3.271 | 3 |
| 6 | 0.249 | 0 | 4.609 | 5 |
| 7 | 0 | 0 | 4.360 | 5 |
| 8 | 0.169 | 0 | 4.529 | 5 |
| 9 | 0 | -0.115 | 4.245 | 1 |
| 10 | 0.463 | 0 | 4.823 | 5 |

| Term | Coefficient |
|---|---|
| wast· | -1.124 |
| poor· | -0.898 |
| disgust· | -0.874 |
| disappoint· | -0.716 |
| custom | -0.633 |
| expens· | -0.629 |
| aw· | -0.625 |
| sad· | -0.590 |
| rude· | -0.554 |
| coaster | -0.408 |
| saw | -0.407 |

[1] just *amazing* there's no *place* in the *world* more *magical* than *disneyland*

*FIG. 29B*

SYSTEM AND METHODS FOR INTERACTIVE TEXT REGRESSION MODEL BUILDING

CROSS-REFERENCE TO RELATED APPLICATIONS

This application claims the benefit of, and priority based on, 35 U.S.C. § 119 to U.S. Provisional Application No. 63/117,967 filed Nov. 24, 2020 and U.S. Provisional Application No. 63/109,570 filed Nov. 4, 2020, the disclosures of each of which are incorporated herein by reference in their entirety.

BACKGROUND

Regression models can be used to estimate a relationship between a dependent variable or outcome and one or more independent variables or predictors. For example, in text analytics certain textual terms in a text dataset can predict a sentiment for the document. For instance, in electronic reviews of a restaurant, words such as worst, gross, and poor may indicate or predict a low rating for the restaurant. In contrast, words such as love, best, and delicious may predict a high rating for the restaurant.

SUMMARY

In an example embodiment, a computer-program product tangibly embodied in a non-transitory machine-readable storage medium is provided. The computer-program product includes instructions to cause a computing system to generate an updated model for a set of regression models. The computing system receives as candidate predictors, for the set of regression models, a list of multiple textual terms. The list of multiple textual terms is for computer identification in one or more datasets. The computing system receives initial user selections, in the graphical user interface, of a first set of textual terms, a response variable, and one or more target values for the response variable. The first set of textual terms comprises multiple candidate predictors from the list of multiple textual terms. The response variable is for a response, of an initial model for the set of regression models, to input to the initial model. The input comprises one or more members of the first set of textual terms. The computing system generates the initial model that estimates a relationship between the one or more target values and the first set of textual terms. The computing system displays in the graphical user interface a representation of the performance of the initial model for user comparison of models of the set of regression models. The computing system displays in the graphical user interface an indication of a contribution, to the initial model, of respective textual terms of a subset of the first set of textual terms. The subset of the first set of textual terms is identified in the initial model as predictors of the one or more target values. The computing system receives a subsequent user selection, in the graphical user interface, to change an aspect of the initial model. The computing system generates, based on the subsequent user selection, the updated model for the set of regression models.

In another example embodiment, a computing system is provided. The computing system includes, but is not limited to, a processor and memory. The memory contains instructions that when executed by the processor control the computing system to generate an updated model for a set of regression models.

In another example embodiment, a method of generating an updated model for a set of regression models.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 illustrates an example collection of datasets for different text-based data sequences according to at least one embodiment of the present technology.

FIGS. 26-27A illustrates examples of graphical user interfaces for selecting multiple target values for model generation according to at least one embodiment of the present technology.

FIGS. 28A-B illustrates examples of graphical user interfaces for comparing multiple models according to at least one embodiment of the present technology.

FIGS. 29A-E illustrates an example graphical user interface for changing a model by changing a graphical representation of a model according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
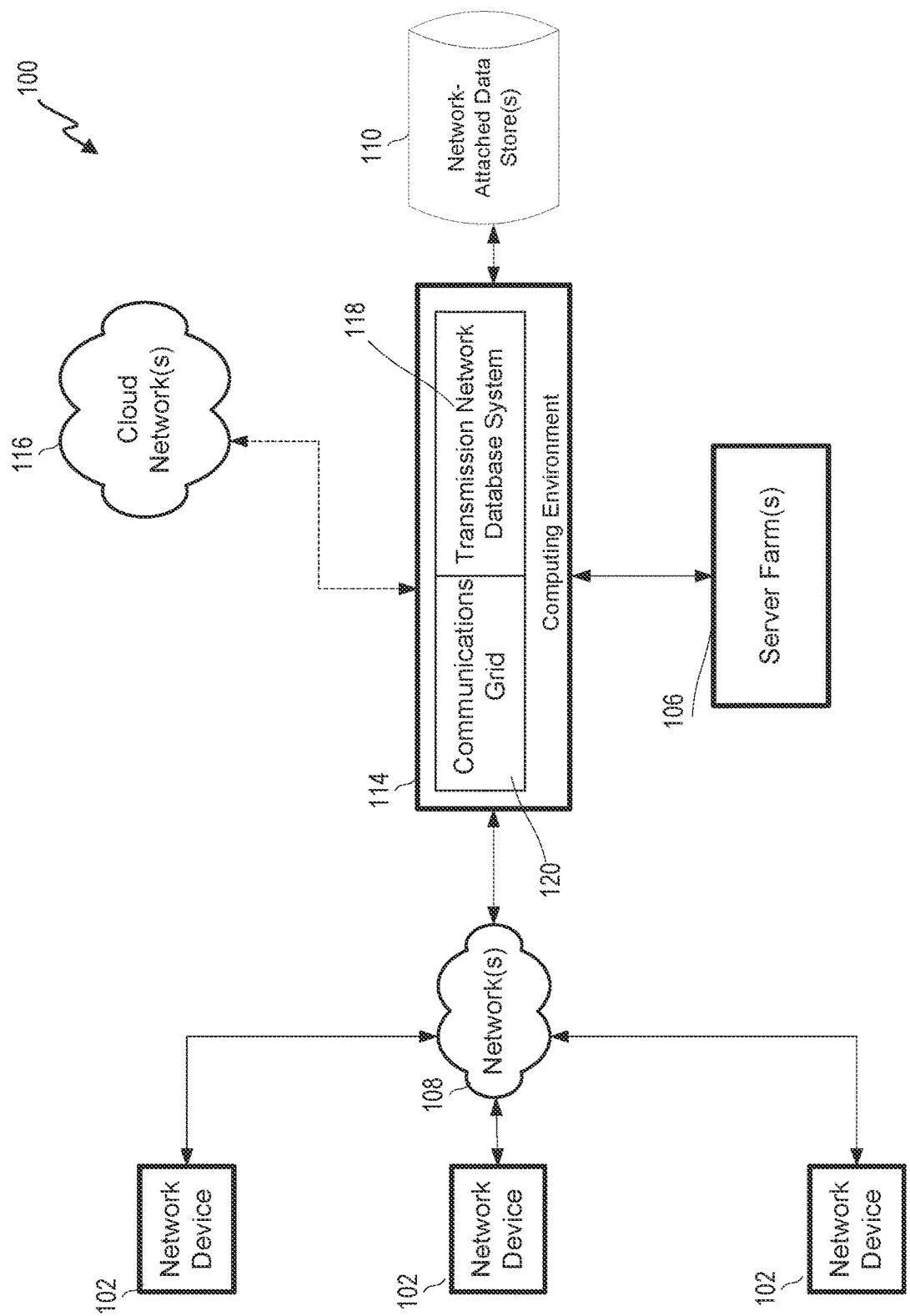
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
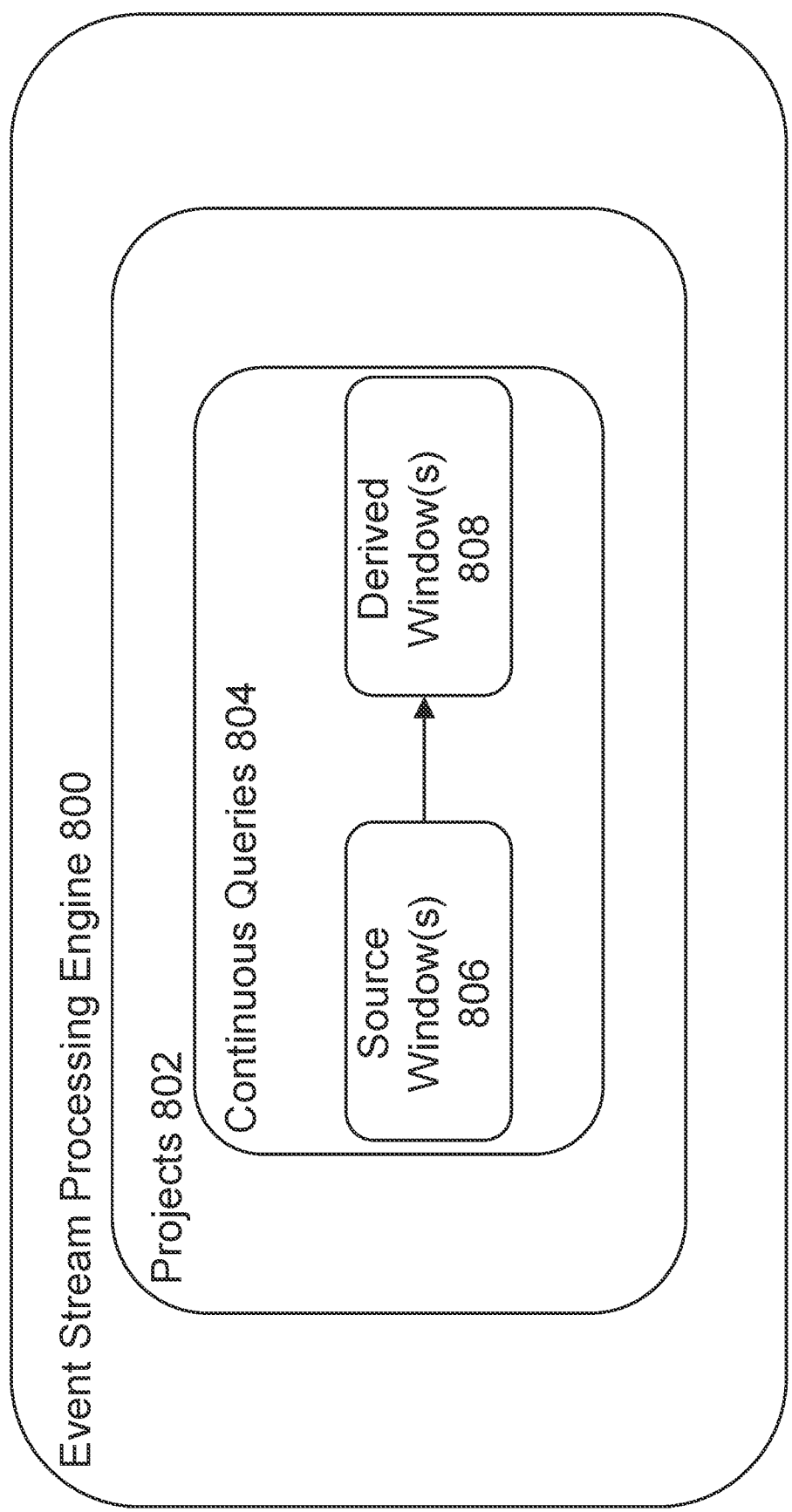
FIG. 8 illustrates a block diagram including components of an Event Stream Processing Engine (ESPE), according to at least one embodiment of the present technology.
Figure 9:
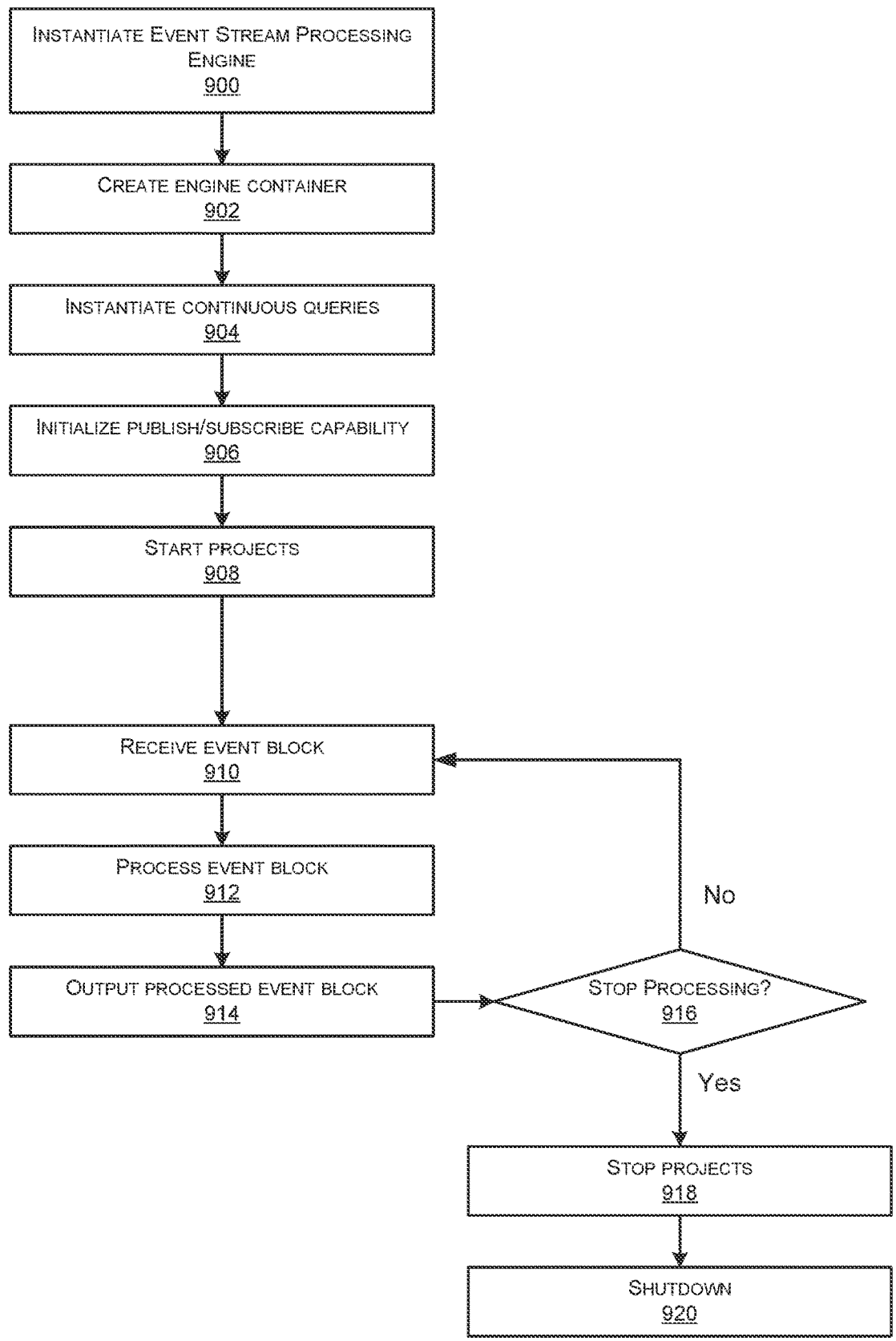
FIG. 9 illustrates a flow chart showing an example process including operations performed by an event stream processing engine, according to at least one embodiment of the present technology.
Figure 10:
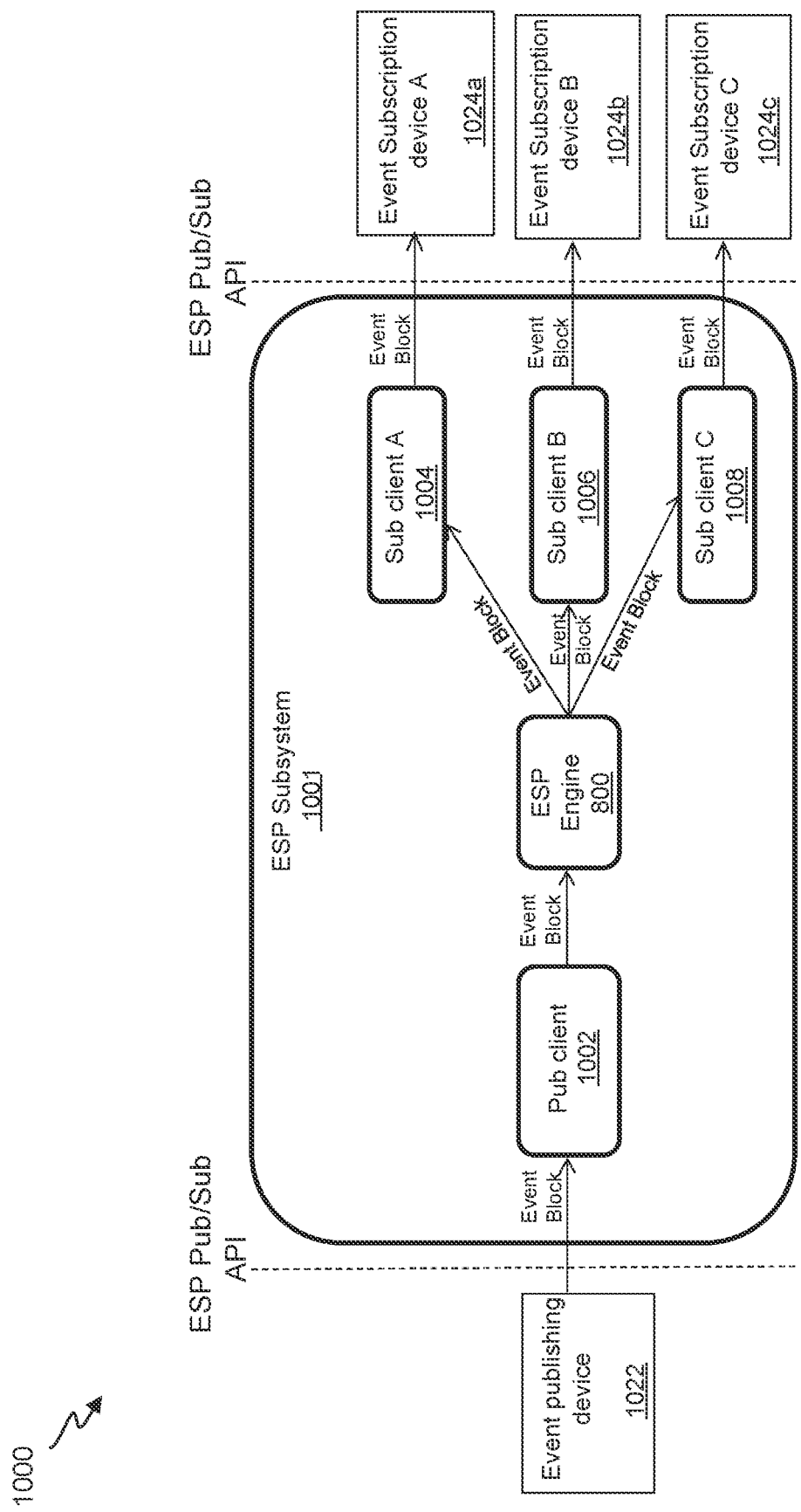
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
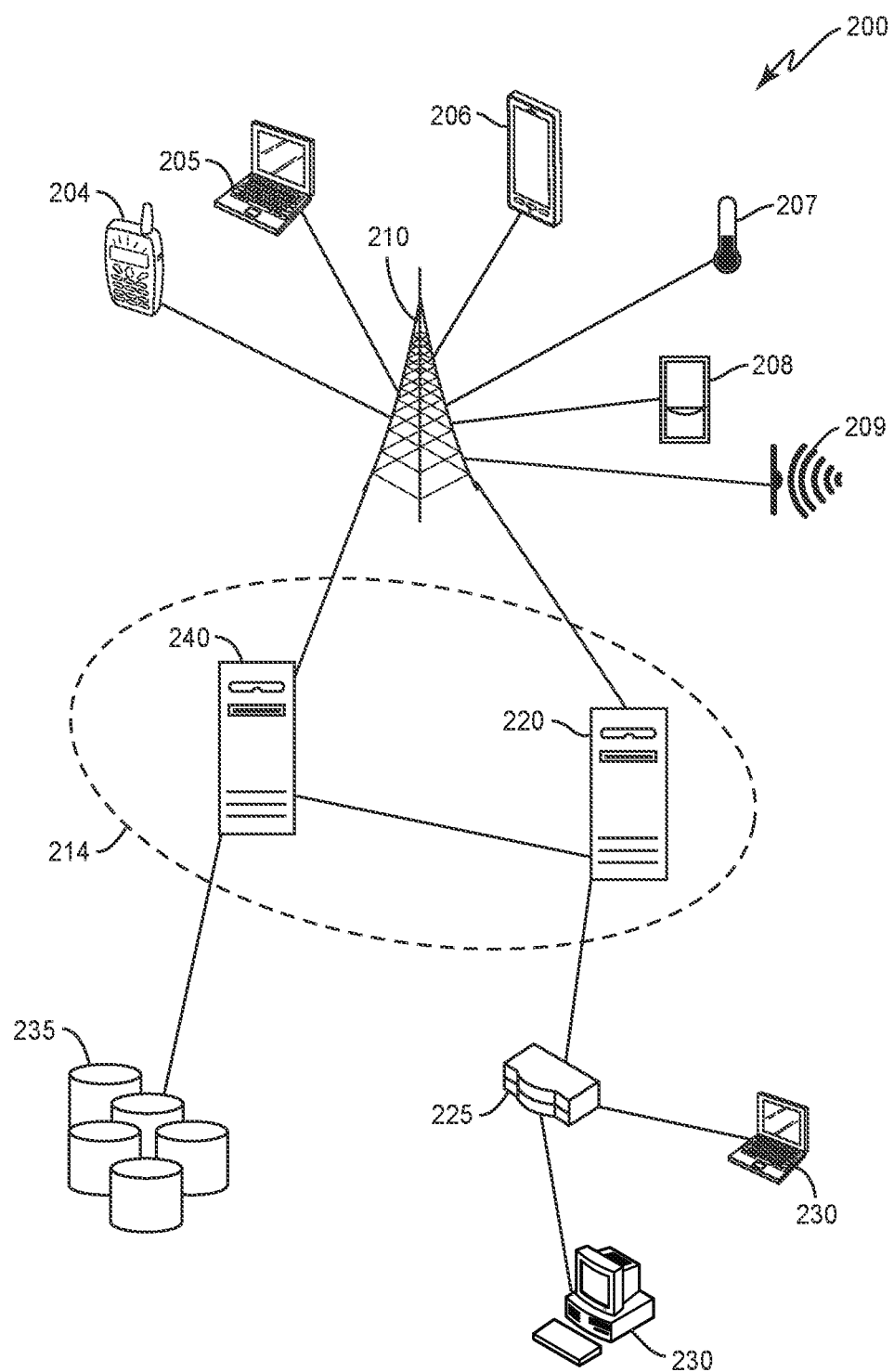
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
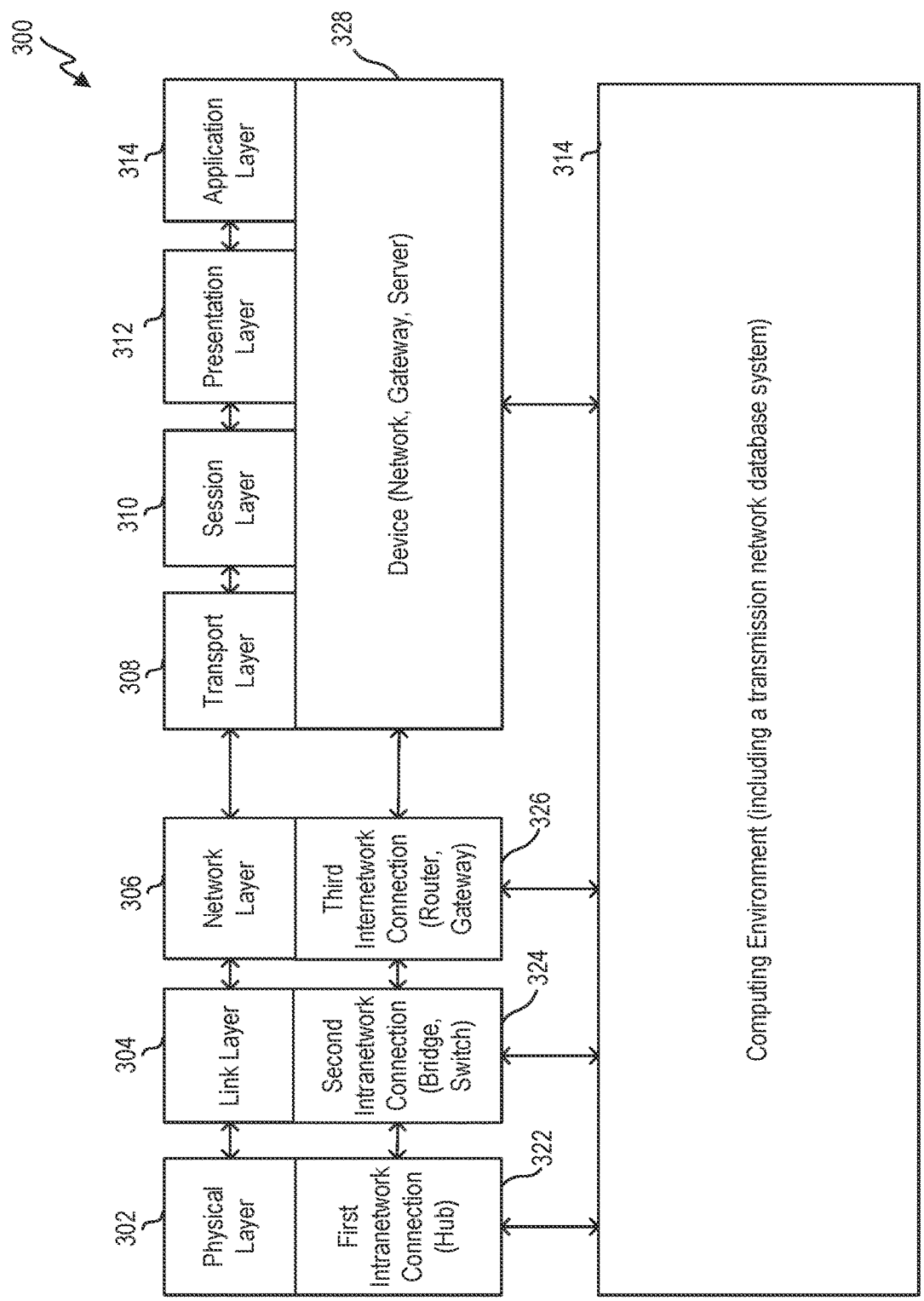
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
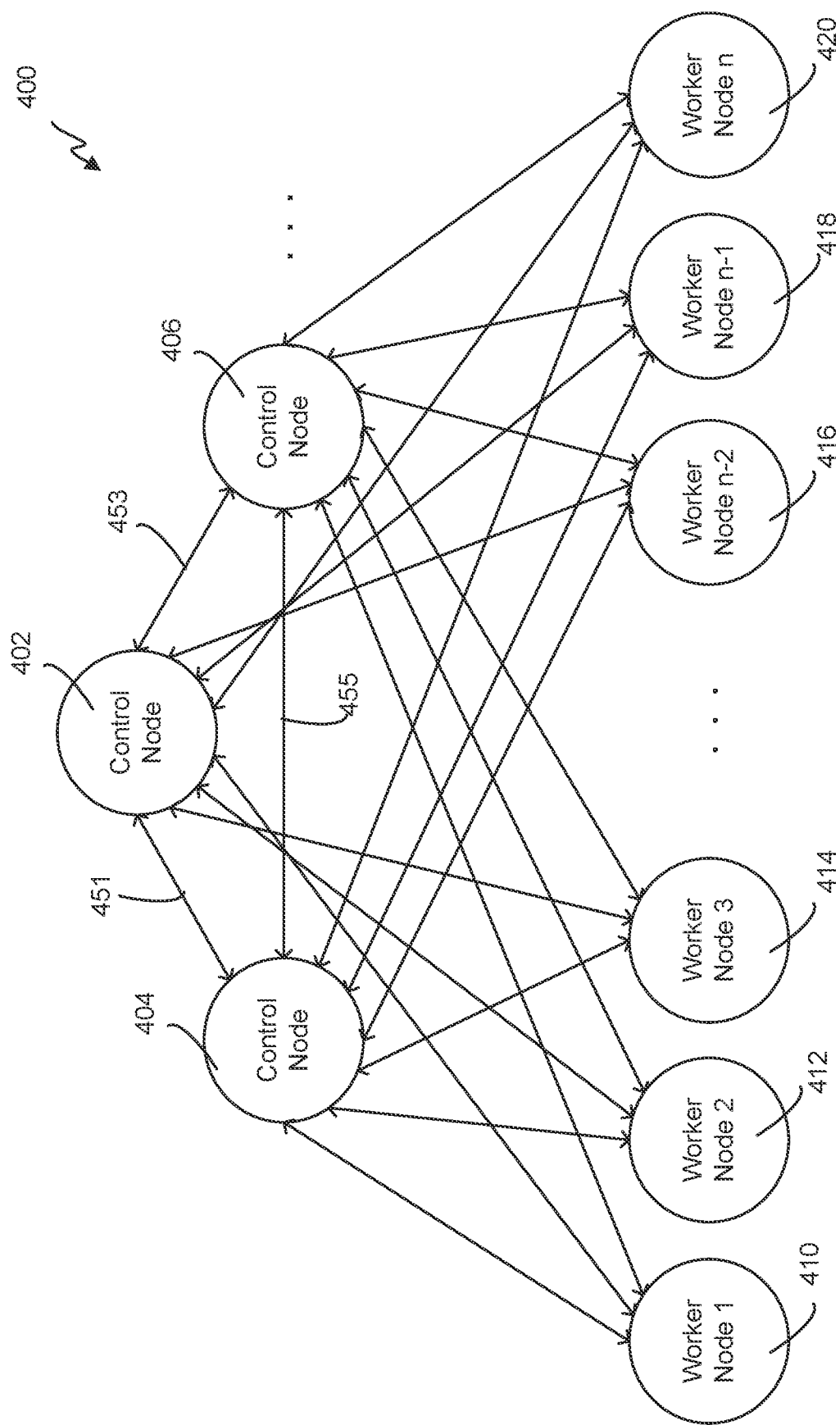
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
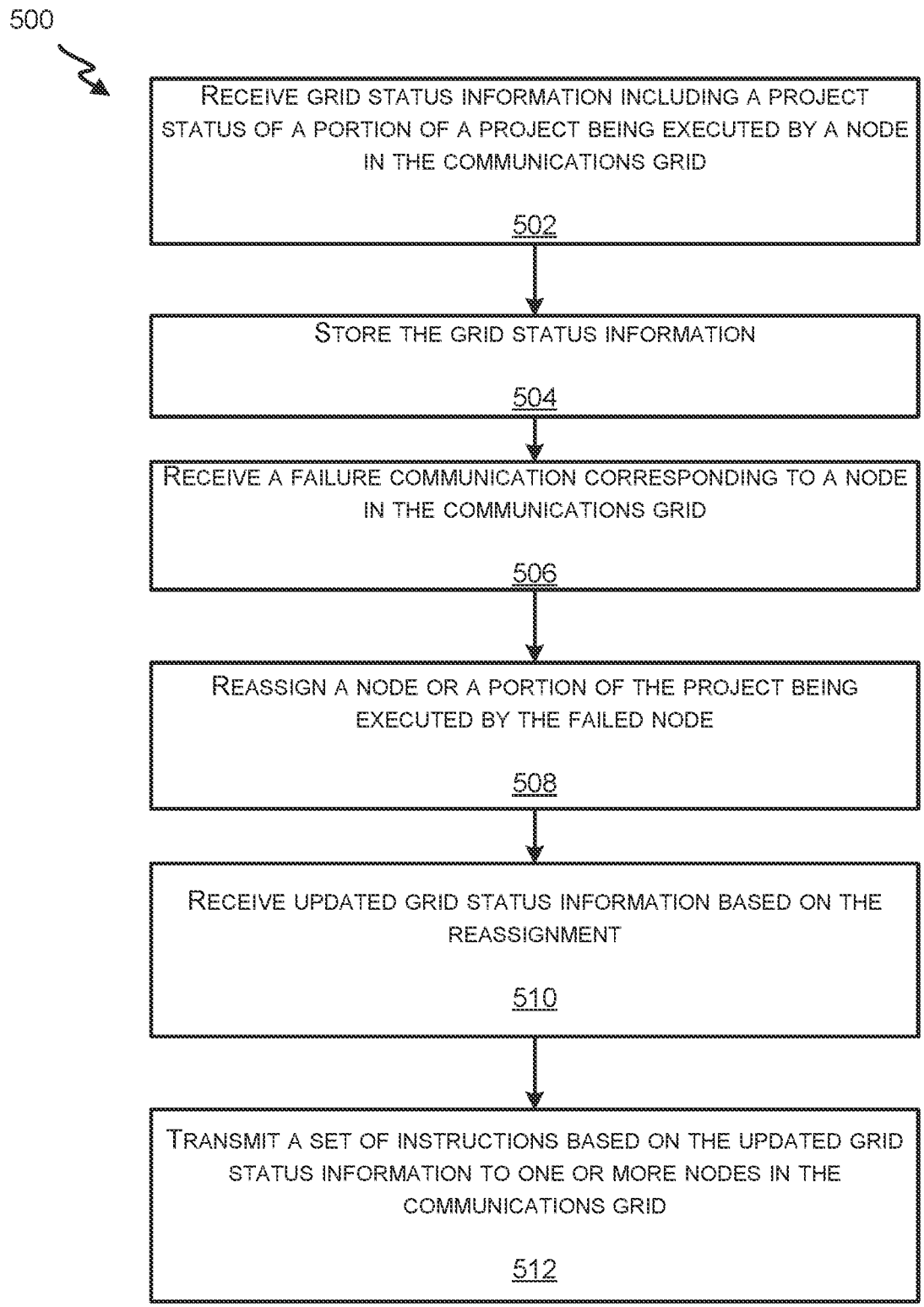
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
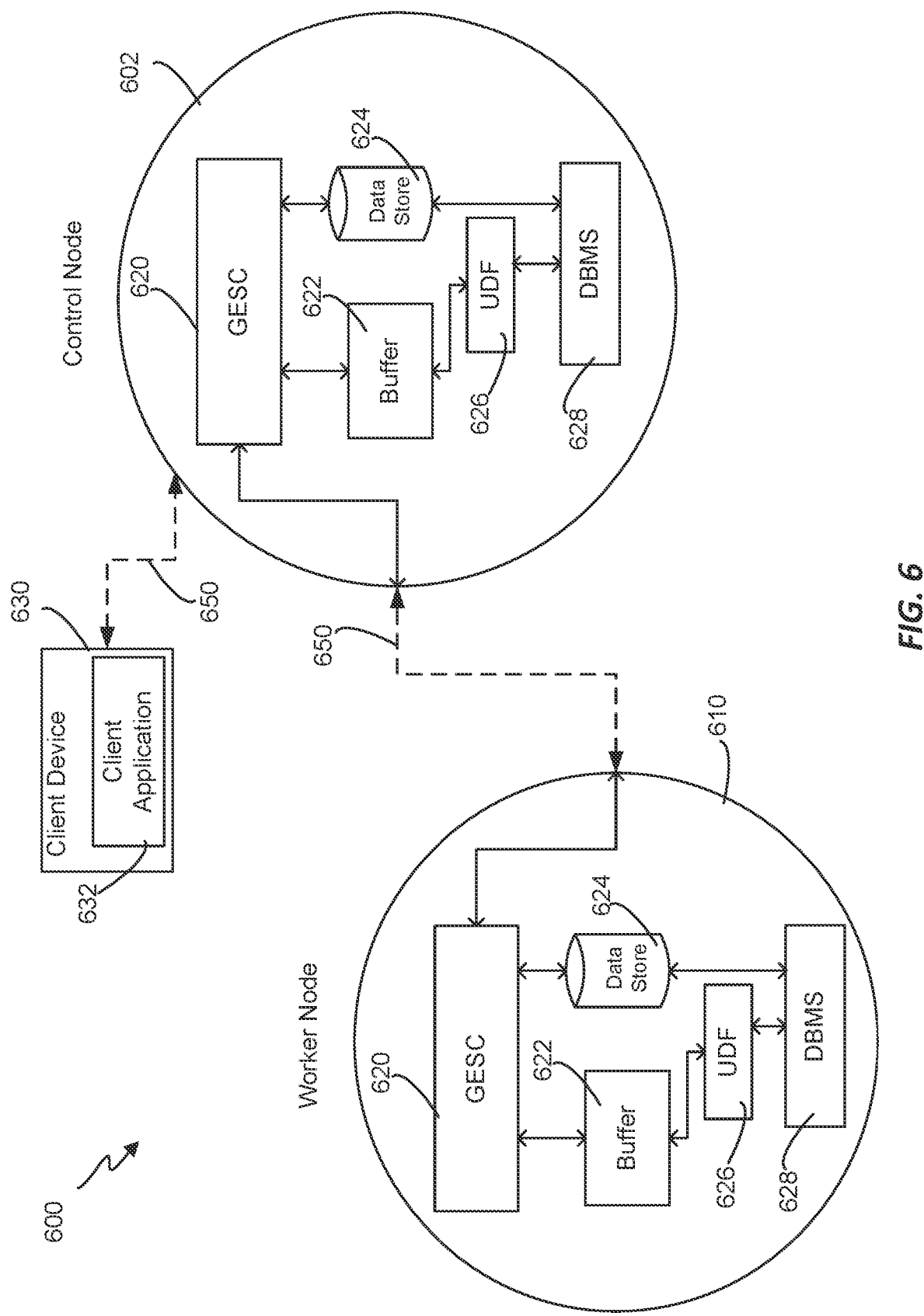
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
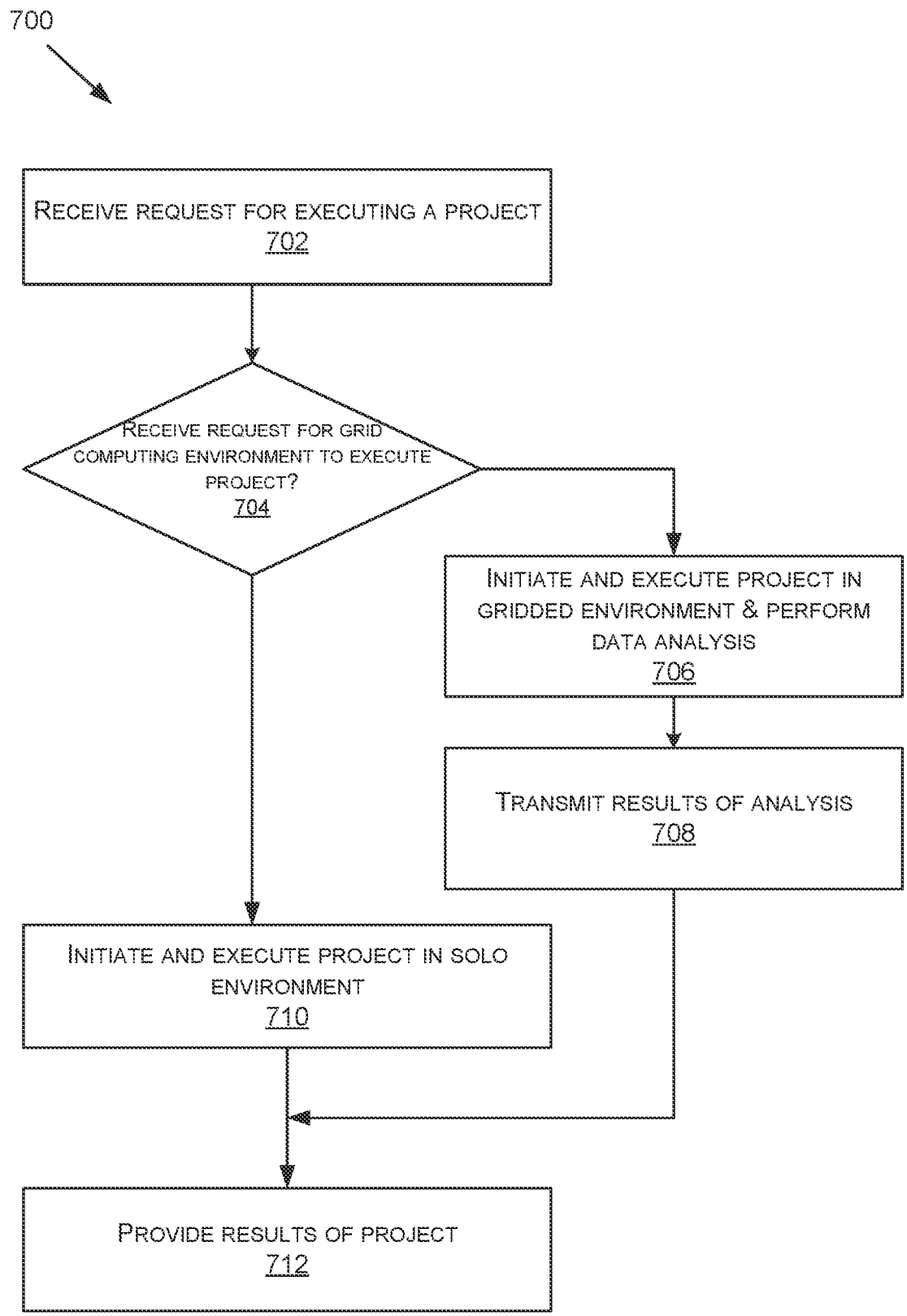
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
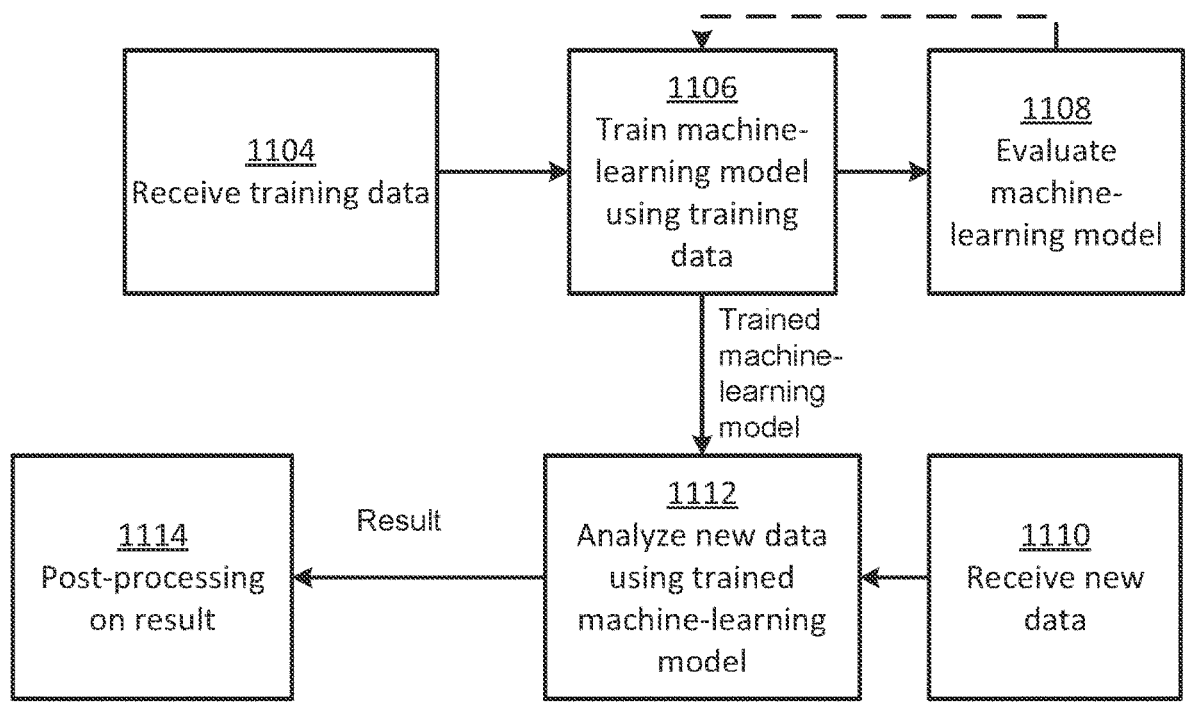
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
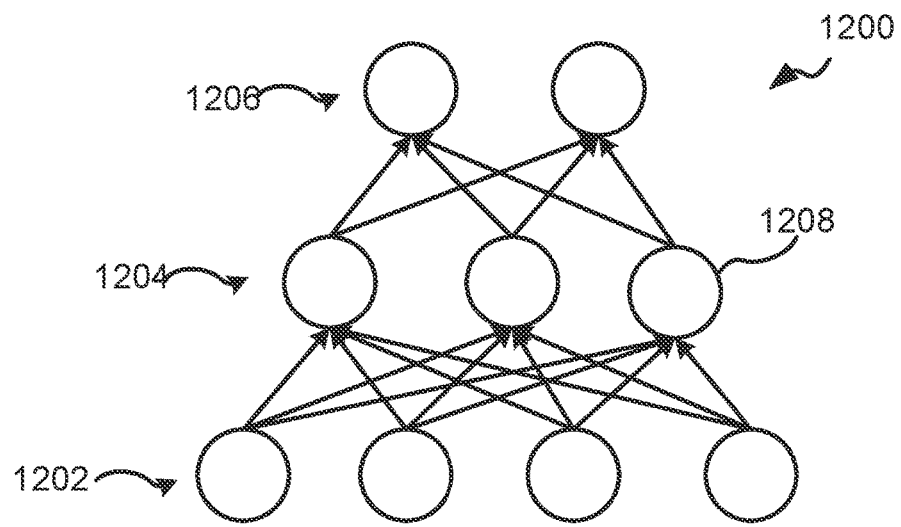
FIG. 12 illustrates an example of a machine-learning model as a neural network according to at least one embodiment of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Regression models are an example of a machine learning approach. Regression models can be useful for data analysis of text data. For example, regression models can help model words associated with a response variable of interest. For instance, a regression model can be conducted for analyzing product reviews to determine which words are associated with positive and negative reviews. Models constructed by machine learning approaches may have some user interaction or manual aspects such as picking a type of model, picking settings for a model, and capturing and organizing results of models. For instance, a user could choose between a linear, logistic, ridge, lasso, polynomial, or Bayesian linear regression model settings. As another example, a user could choose between different validation methods for validating the model in the machine learning approach such as picking between different criterions or different validation approaches like k-fold or cross-validation approaches. This user interactions involved with the manual aspects of building these models and organizing the results can be error prone and time consuming. One or more embodiments can provide a more streamlined and interactive approach to building models, updating models, and comparing models. For instance, one or more embodiments provide an improved structure and functionality of a graphical user interface. The graphical user interface can be interactive to explore model aspects for updating the models (e.g., to improve model settings). These improvements can make building and interpreting models easier, faster, and less error prone.

Figure 13:
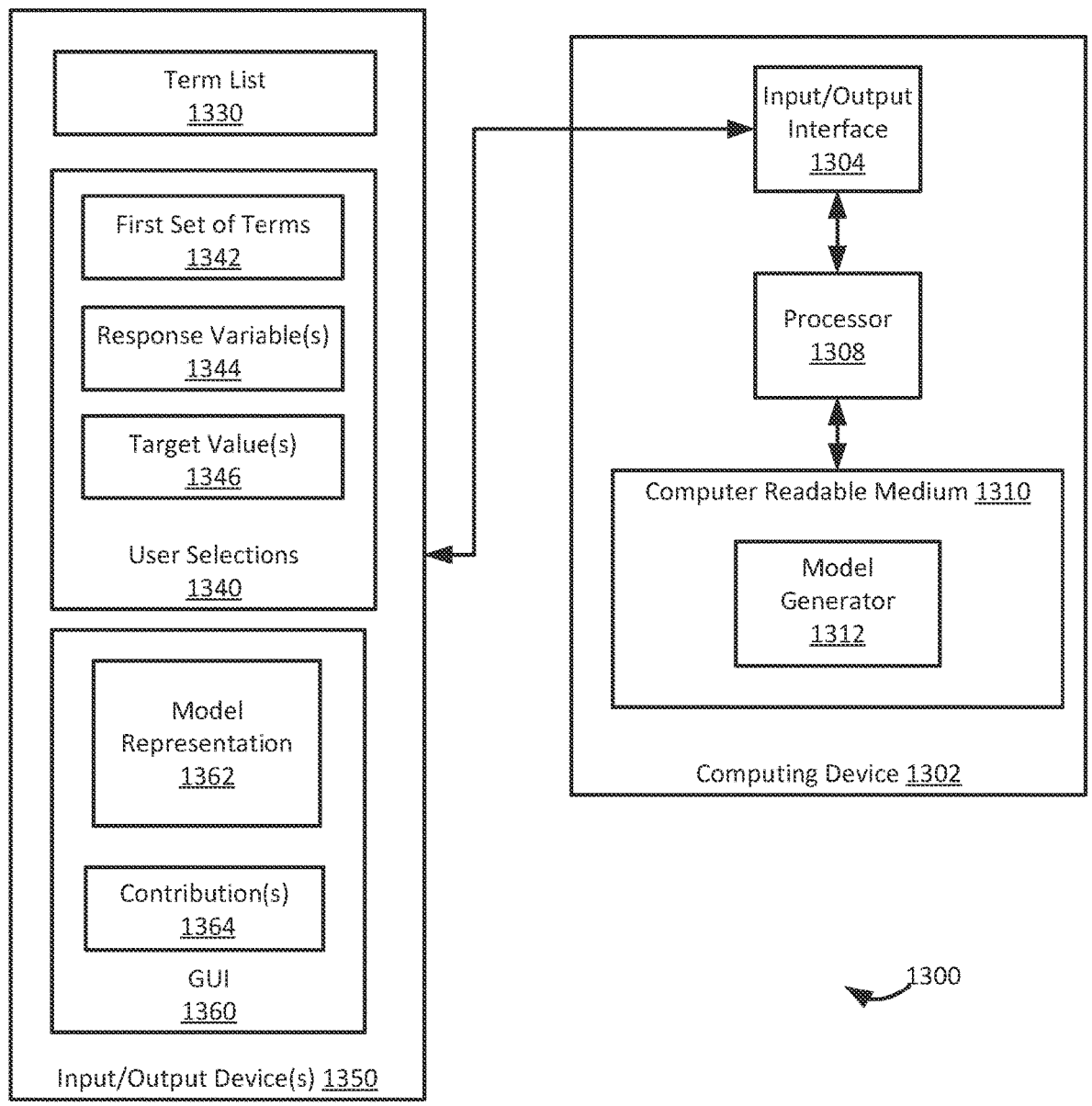
FIG. 13 illustrates a block diagram of a system for generating an updated model according to at least one embodiment of the present technology.

FIG. 13 illustrates a block diagram of a system for generating models (e.g., a model and an updated model). System 1300 includes a computing device 1302. In one or more embodiments, the system 1300 includes one or more input and/or output devices 1350 for sending information to the computing device 1302 and receiving information from the computing device 1302. In one or more embodiments, the information could include a terms list 1330. The terms list 1330 could include a list of one or more textual terms in one or more datasets. For instance, the textual terms can be used for computer identification in the one or more datasets. As an example, the dataset could include information on social media data and the computer identification can be used for sentiment analysis to determine trends in public opinion or emotions of authors of social media posts. As another example, the computer identification could be used for extracting information and making predictions such as predicting the rating of a review, predicting the payout on an insurance claim, predicting a successful job candidate from a resume. Interpreting or identifying components of human language input is useful in one or more computer environments where it is infeasible or impractical to have initial or complete human review of human language text. In such cases a model can be constructed to interpret the text. The terms list 1330 can be candidate predictors for one or more constructed models (e.g., regression models, classification models, predictive models).

The information could be derived autonomously be one or more computing devices (e.g., input and/or output devices 1350 or another device in the system 1300). Alternatively, or additionally the information could include user selections 1340. For instance, a graphical user interface (GUI) 1360 could be used to receive information from a user and display information to the user. As an example, user selection 1340 could include a first set of textual terms 1342 comprising multiple candidate predictors from the term list 1330. The selection could be explicit (e.g., to include a specific term) or implicit (e.g., to include at most 100 terms of the list or to exclude a specific term). Different terms can be used to construct different types of models that derive a model or model rules based on different term sets.

As another example of information from a user, user selection 1340 could include a response variable 1344 for a response of a model to input in the model (e.g., input in an initial model for a set of regression models) and one or more target values 1346. The input could comprise one or more members of the first set of textual terms 1342. For instance, in analyzing an electronic document, words in the first set of terms 1342 could be identified as input for the model for classifying the document. The response variable 1344 could be the classification for the document and a target value 1346 could be a classification type. For instance, if the document is a report of damage to a car in an auto accident, the response variable could be a classification of damages and the target values could be "pay the value of the car" or "repair the car". The terms list may have auto parts and the auto parts found in a particular report could be used as input in a model to output the classification according to the model.

The system 1300 is configured to exchange information between devices in the system (e.g., via wired and/or wireless transmission). For example, a network (not shown) can connect one or more devices of system 1300 to one or more other devices of system 1300. For instance, computing device 1302 has an input and/or output interface 1304 for receiving information from one or more input and/or output devices 1350 and sending responsive information back to the one or more input and/or output devices 1350. Alternatively, or additionally, the system 1300 is integrated into one device (e.g., a touch screen for entry of information and display of information in graphical user interface 1360). For instance, the terms list 1330 could be autonomously generated by computing device 1302 and could be received by computing device 1302 by being extracted for a particular application stored in computer-readable medium 1310 or in response to user selections 1340. Terms list 1330 could also be selected or influenced by user selections 1340 (e.g., a particular term list relevant to product reviews could be selected by a user for building a model to analyze product reviews).

The computing device 1302 has computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input and/or output interface 1304 and with computer-readable medium 1310) to receive, to send, and to process information.

In one or more embodiments, computer-readable medium 1310 stores instructions for execution by processor 1308. In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The one or more application can be integrated with other analytic tools. As an example, the model generator 1312 is integrated into a data analytics software application and/or software architecture such as that offered by SAS Institute Inc. of Cary, N.C., USA. Merely for illustration, an application is implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. For instance, the JMP® platform can be used to help scientists and engineers analyze text by providing information such as word counts, documents clusters and topic analysis. One or more embodiments are integrated into the Text Explorer platform of JMP® (e.g., as a term selection option) and classifications can be feed into further analysis by the Text Explorer platform (e.g., sentiment analysis).

One or more applications stored on computer-readable medium 1310 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, the computer-readable medium 1310 comprises instructions for a model generator 1312. The model generator 1312 determines or generates a model (e.g., an initial model that estimates a relationship between one or more target values 1346 and a first set of terms 1342). For instance, the model generator 1312 could generate an initial model based on a first set of user selections 1340 and then receive a subsequent user selection that indicates to change an aspect of the initial model (e.g., to generate a new model). The computing device 1302 can then generate, based on the subsequent user selection, an updated model. The initial model and the updated model can then be a part of a set of models for user comparison of the models (e.g., comparing regression models).

In one or more embodiments, the one or more input and/or output devices 1350 presents a graphical user interface 1360 for displaying a model representation 1362 generated by the computing device 1302 (e.g., in response to the user selections 1340). For instance, the model representation 1362 could be graphs or metrics of the performance of a given model for user comparison of models in a set. Additionally, or alternatively, the graphical user interface 1360 can display one or more contributions 1364 of a textual term to the initial model (e.g., a textual term from a subset of the first set of terms 1342). For instance, a term like "great" may contribute more to a model prediction of a five-star rating than a term like "okay". The textual term contributions may be a subset that is identified in a model as predictors of the one or more target values 1346. The graphical user interface can be used to receive user selections (e.g., user selections based on, or informed by, the displayed model representation 1362 and the one or more contributions 1364).

In one or more embodiments, fewer, different, and additional components can be incorporated into system 1300. For instance, in one or more embodiments, there are multiple input devices or computing systems (e.g., one to generate the terms list 1330 and another for making user selections 1340). In the same or different embodiments, there are additionally output devices or computing systems (e.g., one to display the GUI 1360 and another for receiving information).

As an example, the same interface supports input and/or output interface 1304. For example, a touch screen provides a mechanism for user input and for presentation of output to the user. In alternative implementations, the computing device 1302 has more than one input interface that uses the same or different interface technology. Alternatively, or additionally, the computing device 1302 has more than one output interface that uses the same or different interface technology.

In one or more embodiments, a computing system (e.g., the system 1300 or one or more devices of system 1300) implements a method as described herein (e.g., a method shown in FIG. 14) for generating models.

Figure 14:
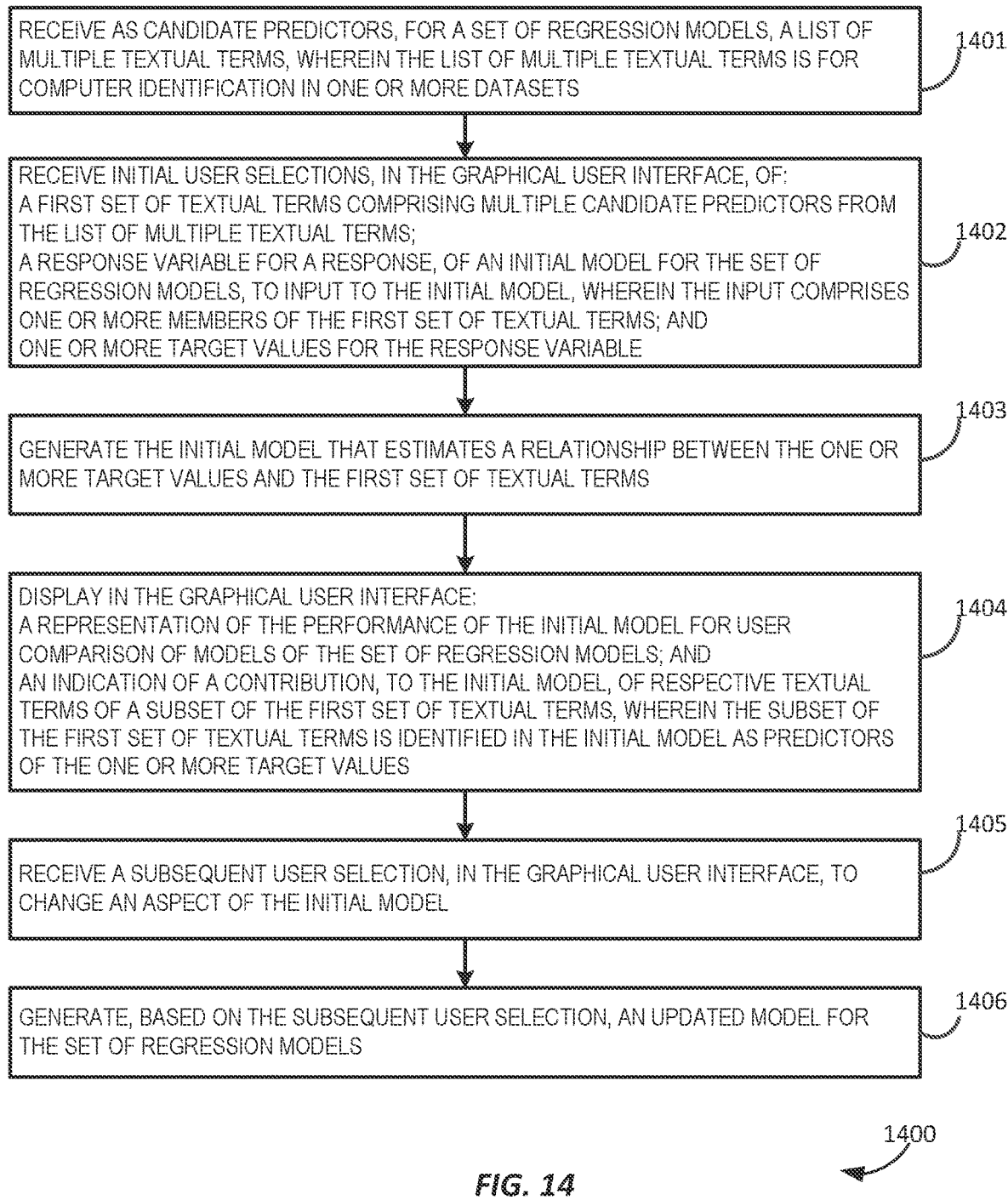
FIG. 14 illustrates a flow diagram for generating an updated model in at least one embodiment of the present technology according to at least one embodiment of the present technology.

FIG. 14 illustrates a flow diagram for generating an updated model. In an operation 1401, the method 1400 comprises receiving as candidate predictors, for a set of regression models, a list of multiple textual terms. The list of multiple textual terms is for computer identification in one or more datasets. For example, the textual terms may be relevant to a particular scenario. For instance, the textual terms could comprise machine parts that when identified in maintenance logs can be used for predicting machine failures based on a computer review of maintenance logs. As another example, the textual terms could be generally relevant to a product review such as words relevant to a consumer liking or disliking a product. Computer identification of these terms in a product review may be useful for predicting a product review outcome such as a rating or reimbursement decision.

In an operation 1402, the method 1400 comprises receiving initial user selections in the graphical user interface. The initial user selections comprise a first set of textual terms comprising multiple candidate predictors from the list of multiple textual terms. This can allow the user to select information particularly relevant to a model or limit the processing time for generating a model. The initial user selections comprise a response variable for a response, of an initial model for the set of regression models, to input to the initial model. The input comprises one or more members of the first set of textual terms. The initial user selections comprise one or more target values for the response variable. The user can also tailor the model to be specific to certain target values for the response variable. For instance, the user may be interested in focusing the fit of a model on terms of a maintenance log that may predict a subsequent machine failure rather than predicting the machine subsequently working.

In an operation 1403, the method 1400 comprises generating the initial model that estimates a relationship between the one or more target values and the first set of textual terms. For example, the model may represent that the term "corroded" in a maintenance log may indicate a machine failure outcome.

In an operation 1404, the method 1400 comprises displaying in the graphical user interface a representation of the performance of the initial model for user comparison of models of the set of regression models; and an indication of a contribution, to the initial model, of respective textual terms of a subset of the first set of textual terms. For instance, if the model is to predict machine failures from maintenance logs, the graphical user interface could display some terms that are likely to contribute positively to a machine outcome failure and/or which terms are likely to contribute negatively to a machine outcome failure. The subset of the first set of textual terms is identified in the initial model as predictors of the one or more target values. For instance, it could be the top ten terms of the set considered for the model that will contribute positively to a machine outcome failure.

In an operation 1405, the method 1400 comprises receiving a subsequent user selection, in the graphical user interface, to change an aspect of the initial model. For instance, based on comparing the models in the graphical user interface the user may indicate to update the model to improve performance or change contributing terms (e.g., change an existing model or generating a new model to add to the set of models).

In an operation 1406, the method 1400 comprises generating, based on the subsequent user selection, an updated model for the set of regression models. In one or more embodiments, the method 1400 is useful for generating models for predicting classifications of datasets for different text-based data sequences.

FIG. 15 illustrates an example collection 1500 from one or more datasets of different text-based data sequences in electronic documents. In this example, the text-based data sequence comes from electronic logs regarding different airline plane incidents that occurred in different areas (e.g., event city field 1501 and event state field 1502 show different locations). A narrative field 1505 provides an example narrative representing a text-based data sequence from the electronic logs. The text-based data sequence could pertain to other subject matter and could come from other sources such as, but not limited to, a transcript of a recording, a scan of printed text, and an extraction from internet-based websites. This example collection 1500 also has information stored regarding the text-based sequences such as outcomes like an injury_level field 1504 for recordings whether the incident resulted in none, minor or fatal injuries, and airplane damage 1503 for recording whether the airplane experienced substantial damage, was destroyed, or experienced no damage. One or more embodiments can be used to train a model to predict these outcome fields based on a text narrative and provide a graphical user interface for comparing models.

Figure 16:
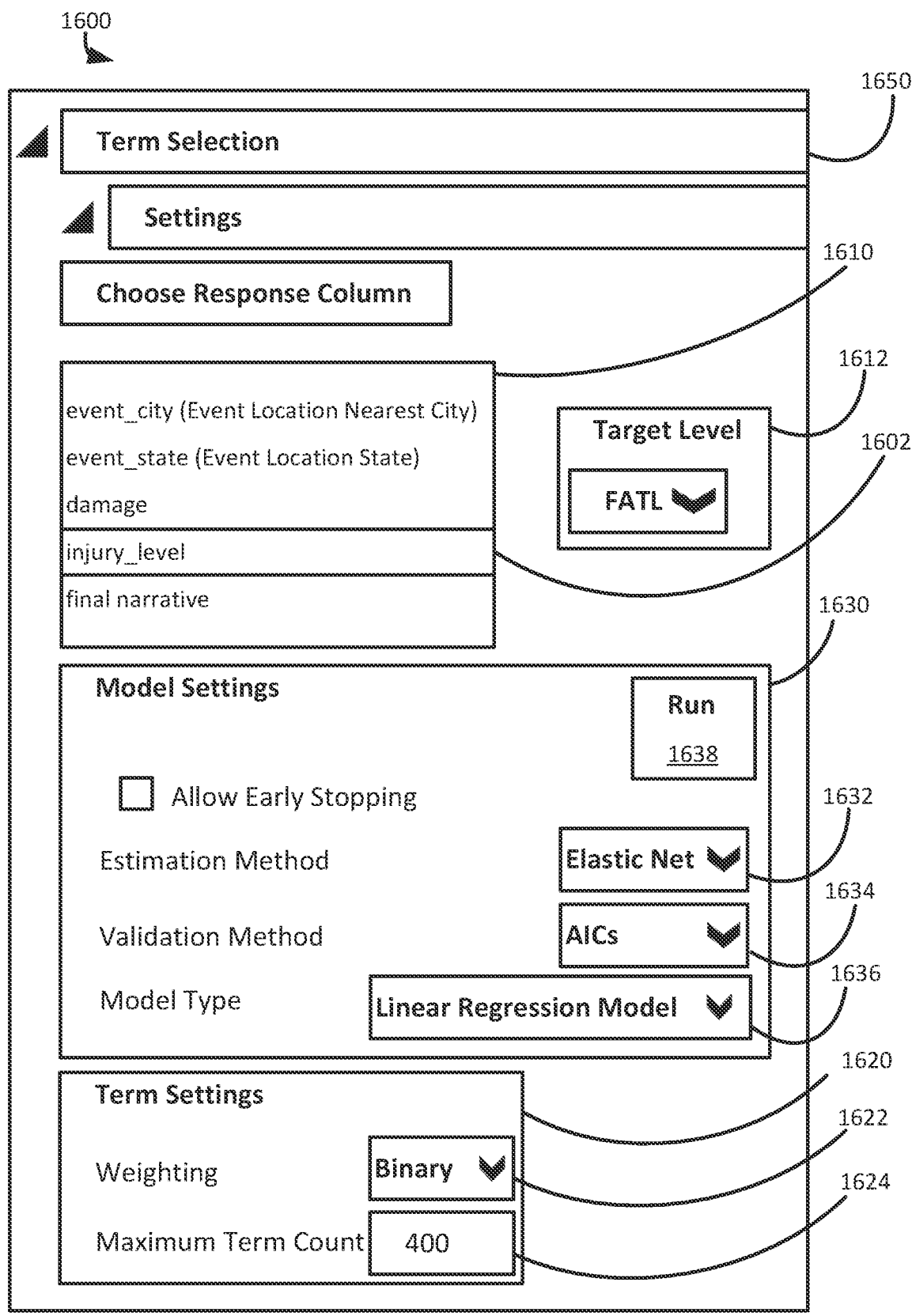
FIG. 16 illustrates an example graphical user interface for selecting settings for model generation for selected textual terms according to at least one embodiment of the present technology.

FIG. 16 illustrates an example graphical user interface 1600 for selecting settings for model generation for selected textual terms. In one or more embodiments, a computing system can have default settings. Additionally, or alternatively, a computing system can receive a user selection to select one or more settings (e.g., by the user changing default settings and hitting the run button 1638 to generate a model). The different settings can be set or changed for generating different types of models or an updated model (e.g., different model types, different validation methods, or different estimation methods).

In the example FIG. 16, the user can select different settings for a set of regression models. For example, choose response column window 1610 provides various response options for selection by the user. In this example, a user has selected a response or outcome for a regression model (injury_level response 1602) and a target level 1612 of "fatl" for a fatal injury. In this example, the response type was a single non-numeric value. However, multiple, or other types of responses could have been selected (e.g., continuous, or discrete numeric).

In one or more embodiments a graphical user interface (e.g., graphical user interface 1600) displays one or more term settings. For example, FIG. 16 shows the graphical user interface 1600 displaying multiple term settings 1620. In this example, the textbox 1624 can be used to control a total of terms considered from a list of multiple textual terms as candidate predictors. This provides a maximum term count. Other term settings could be used such as a range or a minimum.

In the example in FIG. 16, model settings 1630 can be used for user selection of model settings. For instance, the menu 1636 can be used to select a model type. In this example, the user has selected a "linear regression model" type. A linear regression model can be specified, for example, as $E(y)=\beta_0+\beta_1 x_1+\ldots+\beta_p x_p$, where y is a response of the model according to predictors x. For example, the response may be a rating for a product, and a predictor may be a term like "broken" in text regarding the rating. For instance, if binary weighting is used $x_1$ would take on the value of 1 if "broken" appears and 0 if "broken" does not appear. The co-efficient $\beta_1$ can be used to differently weight the impact of the predictor to the model outcome.

Other model types could be available such as a logistic regression that can be used to provide a response with two levels between 0 and 1 (e.g., predict user would recommend or would not recommend, or predict a yes or no). The logistic function can be used to ensure predicted probabilities are between 0 and 1. For instance, $$Pr(\text{would recommend})=\text{logistic}(xB), \text{ where}$$

$$Pr(\text{would recommend}) = \text{logistic}(xB), \text{ where logistic}(xB)) = \frac{1}{1+e^{-xB}}$$

Model settings 1630 can additionally or alternatively, allow a user to select a validation method for validating the model. In this example, an Akaike information criterion (AIC) validation method is selected in menu 1636. An AIC is an estimator of prediction error and can be used for validating or selecting between competing model options. In one or more embodiments, a graphical user interface (e.g., graphical user interface 1600) can display validation options for validating the model. For example, the menu 1634 can be used to drop-down options for a user to select between different validation options such as an AIC, a Bayesian information criterion (BIC) validation, a holdout validation; and a cross validation such as k-fold validation.

With a BIC validation and an AIC validation, a BIC value, or an AIC value, respectively, is computed for each possible model, and a lowest value is selected. For instance, a BIC value may be computed as BIC=k ln(n)−2 ln($\hat{L}$) and an AIC value may be computed AIC=2k−2 ln($\hat{L}$) where:
k=the number of parameters estimated by the model
n=the number of data points in the observed data (x)
$\hat{L}$=the maximized value of the likelihood function of the model (M) where
$\hat{L}$=p(x|, $\hat{\theta}$M) and $\hat{\theta}$ is the parameter values that maximize the likelihood function.

Alternatively, the BIC value or AIC value may be computed differently for validation. For instance, the AIC validation can instead compute an $AIC_c$ value, which provides a correction of the AIC value helpful for smaller data set samples. The $AIC_c$ value can be computed as $$AIC_C = AIC + \frac{2k^2 + 2k}{n - k - 1}.$$

With holdout validation and k-fold validation, a sample of data is held out to test a formed model and the model that predicts the best is selected. With k-fold validation a data sample is partitioned into k subsamples, and a subsample is retained as validation data for testing the model with the remaining samples (k−1) used as training data.

With each of these selected validation options or other validation options not explicitly discussed, a computing system can receive an indication of a validation option and generate an initial model by selecting a given model based on the validation option (e.g., selecting between different model options based on a criterion or performance with a sample).

In one or more embodiments, term settings (e.g., term settings 1620) can be used to select a set of terms for a model (e.g., by receiving a user selection of term settings displayed in the graphical user interface 1600).

Term settings 1620 can also be used to control a term's importance to a model or in a term's list (e.g., if there are more terms than allowed by a maximum term count). For example, the graphical user interface 1600 also shows a weighting option 1622 to control a weighting of frequency of textual terms. In this example, a binary weighting will indicate if a term occurs in a document (e.g., a 1 no matter how many times) of if it does not (e.g., a 0). Other weights could be used such as a ternary weighting, a frequency weighting, a log frequency weighting, or a term frequency-inverse document frequency (TF IDF). In a ternary weighting, one indicator is used to indicate a term occurs multiple times (e.g., a 2), one indicator if it occurs only once (e.g., a 1), and one indicator if it occurs not at all (e.g., a 0). In a frequency weighting, an indicator can simply indicate a count of a term's occurrence. In a log frequency weighting an operation can be used to reduce the effect of a term's occurrence (e.g., log 10(1+x) where x is the count of a term's occurrence). In a TF IDF, the weighting both reduces the effect of a term's occurrence and accounts for the number of documents that use it (e.g., a TF*log(nDoc/nDocTerm), where TF is the frequency of the term, nDoc is the number of documents and nDocTerm is the number of documents that contain the term.

The Text Explorer platform in JMP® is an example of a platform for tracking occurrence of terms and phrases. In this example, graphical user interface 1600 is accessed as a term selection option 1650 in Text Explorer. The Text Explorer platform can be used to provide summaries of data for input into a model (e.g., a summary of the of the most frequently occurring terms and phrases in documents). These summaries can be provided to the user for making informed selections in graphical user interface 1600. Further, a user can be prompted to specify details to generate a model (e.g., response variable, or desired variable selection technique). For instance, graphical user interface 1600 could be a launch dialog making it easy for a user to specify details about a model or to update a model (e.g., a text regression model).

Figure 17:
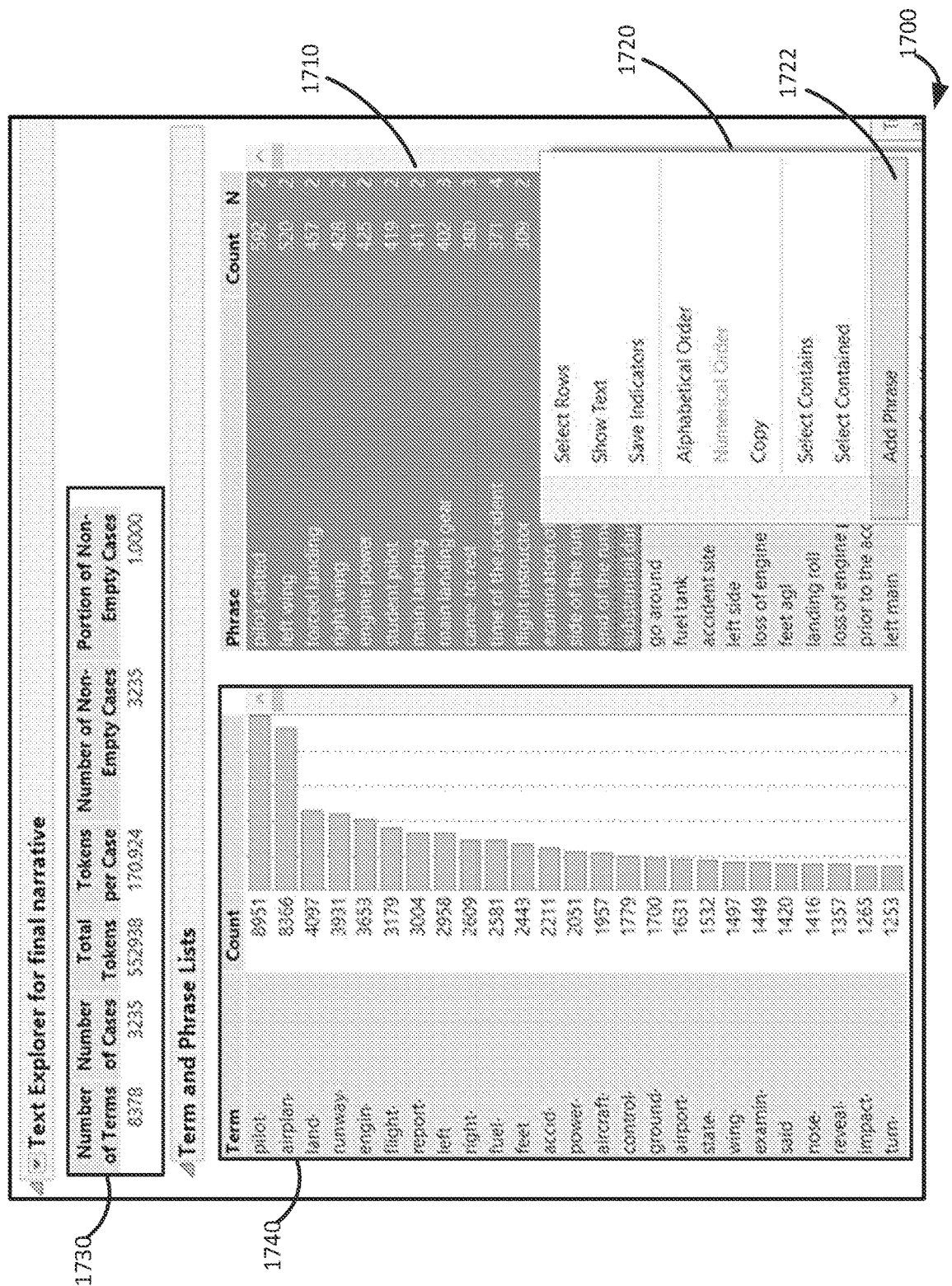
FIG. 17 illustrates an example graphical user interface for adding phrases to selected textual terms for a model generation according to at least one embodiment of the present technology.

In one or more embodiments a graphical user interface can display a terms list of candidate predictors. For instance, FIG. 17 illustrates an example graphical user interface 1700 with a terms list 1740 of terms that can be candidate predictors. Statistics 1730 can also be displayed for the terms for a user to consider a terms list. In this example, the statistics 1730 comprise an indication of the total number of possible terms (8,378) and the total number of cases in which those terms are found (e.g., 3,235 datasets or electronic documents). Tokens are a sequence of one or more characters found in a data representing text. In this example, there were 552,938 tokens found in the cases with an average token per case of 170.924. All the cases had data, so there were 3,235 non-empty cases (i.e., the portion of non-empty cases was 1.0).

A given term in the terms list 1740 could represent more than one word part (e.g., words "take" and "took" could be identified by the same term "take"). In the example terms list 1740 prefixes are displayed such that the single term will encompass any tokens found with those characters as a prefix (e.g., words "pilot" and "pilots"). In this example, the terms list 1740 has multiple textual terms generated from word parts identified in the cases. A user can explore the terms in the terms list to see if there are multiple terms represented by a term in the terms list 1740. For instance, a user can click on or hover over a term in the terms list 1740 to see if there are multiple terms represented by a term in the terms list. Alternatively, a term may be displayed with symbols to indicate multiple terms (e.g., "pilot*" to indicate a term contains a stemmed or truncated version of pilot). Alternatively, or additionally, input may be modified to replace terms in a text containing a set of multiple terms with a single term. For instance, text may be modified to replace "take" with "took".

In one or more embodiments, a computing system determines a first set of textual terms as candidate predictors for generating a model by receiving an indication of a quantity of textual terms via a graphical user interface. For instance, as shown in this example, there are more terms than the maximum term count of FIG. 16 in textbox 1624. By limiting the maximum term settings, a user can limit the terms for deriving the model. Further, a user can change the maximum term count to update the model derived from the list of possible terms.

The selected terms can be selected based on criteria such as the priorities of the word parts. For example, the terms can be prioritized based on the frequency of the word parts identified in the one or more datasets. For instance, "pilot-" is shown at the top of the list because it was the most frequently found word part.

Additionally, or alternatively, a user can remove terms or add terms and phrases to the list of candidate predictors. FIG. 17 illustrates an example graphical user interface 1700 for adding phrases to selected textual terms for a model generation. In this example, a user has highlighted in blue the set of phrases 1710. A menu 1720 appears in the graphical user interface 1700 (e.g., automatically in response to highlighting the set of phrases 1710, or by right clicking the set of phrases 1710).

In the set of phrases 1710, the phrases have a specific word order and distance. Additionally, or alternatively, the set of phrases 1710 could include virtual terms (e.g., to allow terms to be a variable distance apart or in different orders). For example, the phrase list could include "river*bank" to allow the model to predict a response based on riverbank or bank of a river. Limits could be applied to how far apart the terms of the virtual term could be (e.g., left/wing may allow the model to respond to wing left or left wing, but not left of the wing). A virtual term could comprise two or more terms (e.g., German*chocolate*cake to allow for identification of German pecan chocolate cake or German chocolate pecan cake).

A term entity (e.g., a single term, a phrase, a virtual term) could be added or removed to the phrases 1710 or the terms list 1740 by the user or derived independent of the user by the computing system (e.g., using machine learning techniques). For instance, a computing system may allow phrases to be added that were identified in previous datasets or based on determined subject matter for the input to the model (e.g., adding plane parts for an application related to airplane incident reports). For instance, the menu 1720 can be used to add or remove phrases to the list of terms to be considered. For example, the control 1722 can be selected to add the phrases such that the computing system receives a user selection to add a term entity to a list of multiple textual terms such as terms list 1740.

Figure 18:
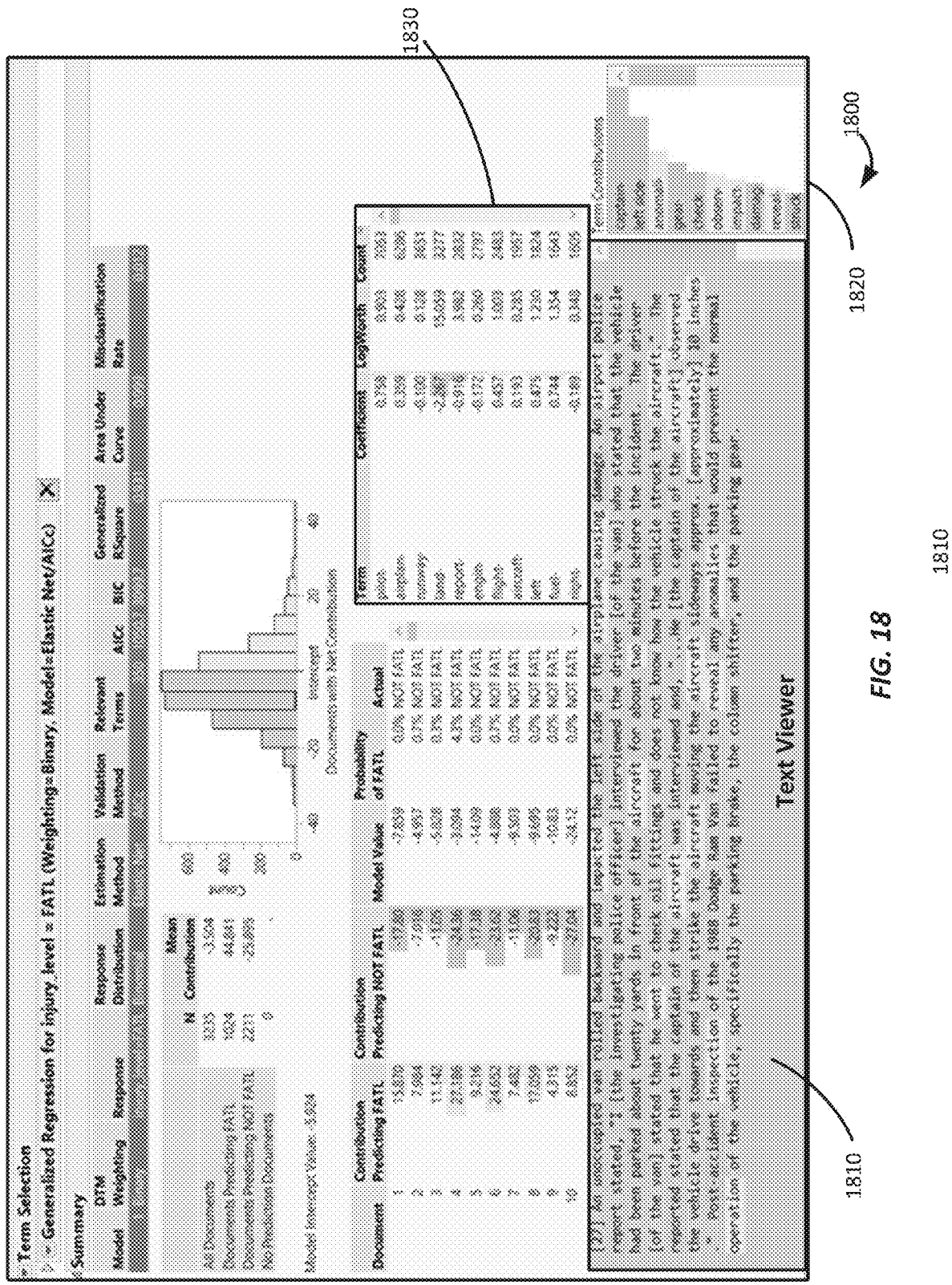
FIG. 18 illustrates an example graphical user interface with interactive model information for a generated model according to at least one embodiment of the present technology.

FIG. 18 illustrates an example graphical user interface 1800 of interactive model information for a generated model. In this example, a regression model was generated from settings selected in graphical user interface 1600 of FIG. 16 from a document term matrix to predict a response variable specified by the user. A document term matrix is a matrix of indicators for whether a document includes a particular word or phrase of a terms list and may be weighted by word frequency. For instance, Table 1 below shows an example document term matrix where each document is a row, each word a column for two simple sentences: The packaging was frustrating. The shape and color were great.

TABLE 1

| Packaging | Shape | Color | Scent | Bad | Great | Frustrating |
|---|---|---|---|---|---|---|
| 1 | 0 | 0 | 0 | 0 | 0 | 1 |
| 0 | 1 | 1 | 0 | 0 | 1 | 0 |

In the example in FIG. 18, the electronic text was more complicated and pertained to airplane accident narratives. Graphical user interface 1800 shows a regression report and summarizes relevant terms. For instance, a terms table 1830 shows a ranking of some of the top-ranking terms of a subset of terms used in the model. In this example, the terms are ranked based on their contribution to the model. In other examples, they could be ranked based on other or additional criteria such as their frequency of identification. A document term matrix can be used for determining frequency of identification.

In this example, a variable selection technique was used to divide the terms into three categories: no contribution (zero coefficient), positive contribution (positive coefficient), and negative contribution (negative coefficient). Some terms that provide a negative contribution to a Star Rating are summarized in the terms table 1830 as an example. A report could include a terms table for each contribution or sets of contribution (e.g., both positive and negative contributions could be included).

In one or more embodiments, textual terms are computer identified in one or more datasets associated with different text-based data sequences. For example, graphical user interface 1800 shows an example text viewer 1810 that display an indication of the contribution to the initial model of respective textual terms of a subset of terms found in the text of an electronic document identified in the text viewer 1810 as "[27]". In this example, the text-based data sequence comes from an electronic document regarding collected data on airline plane incident reports.

FIG. 15 shows other collected data used in generating the model. Terms highlighted in purple in the text viewer 1810 indicate identified terms that contribute to predicting a not-fail outcome for the airplane incident according to a regression model. Terms highlighted in orange indicate identified terms that contribute to predicting a failure outcome according to the regression model. Accordingly, the graphical user interface 1800 applies a first visual identifier pattern (e.g., purple color) to a first term (e.g., "rolled") of the first set of textual terms to indicate a first predictive ability for predicting one or more target variables (e.g., contributing to predicting a not fatal accident). The graphical user interface 1800 applies a second visual identifier pattern (e.g., orange color) to a second term of the subset of the first set of textual terms (e.g., "impacted") indicating a second predictive ability for predicting the one or more target values (e.g., contributing to predicting a fatal accident). As in this case, the predictive ability could relate to the predictive ability to positively or negatively indicate a particular target variable (fatal) or to indicate a specific target variable (not fatal or fatal). Other patterns could have been applied to particular terms in addition to or alternatively with color such as, but not limit to, italicizing a term, underlining a term, and putting a shape around a term.

As shown a single text document could have many terms that must be considered in a prediction according to a model. In this example, a terms table 1820 with a subset of terms specific to terms in the text viewer 1810 is displayed. The terms table 1820 is ranked based on the terms contribution to predicting an outcome for the text in text viewer 1810.

In one or more embodiments, a computing system allows a user to focus on one or more terms (e.g., for a user to see how that term is influencing the model). For instance, the computing system may receive a term selection (e.g., from a user) in a subset displayed in the graphical user interface (e.g., in text viewer 1810, in terms table 1820, or terms table 1830); and in response to the term selection, display in the graphical user interface the selected term in a text-based data sequence of the different text-based data sequences.

Graphical user interfaces like the one shown in FIG. 18 enable a user to better interpret and understand how a model is applied to a text for improving the performance of the model. Graphical user interfaces can also be interactive to allow a user to directly augment the model from a report.

Figure 19:
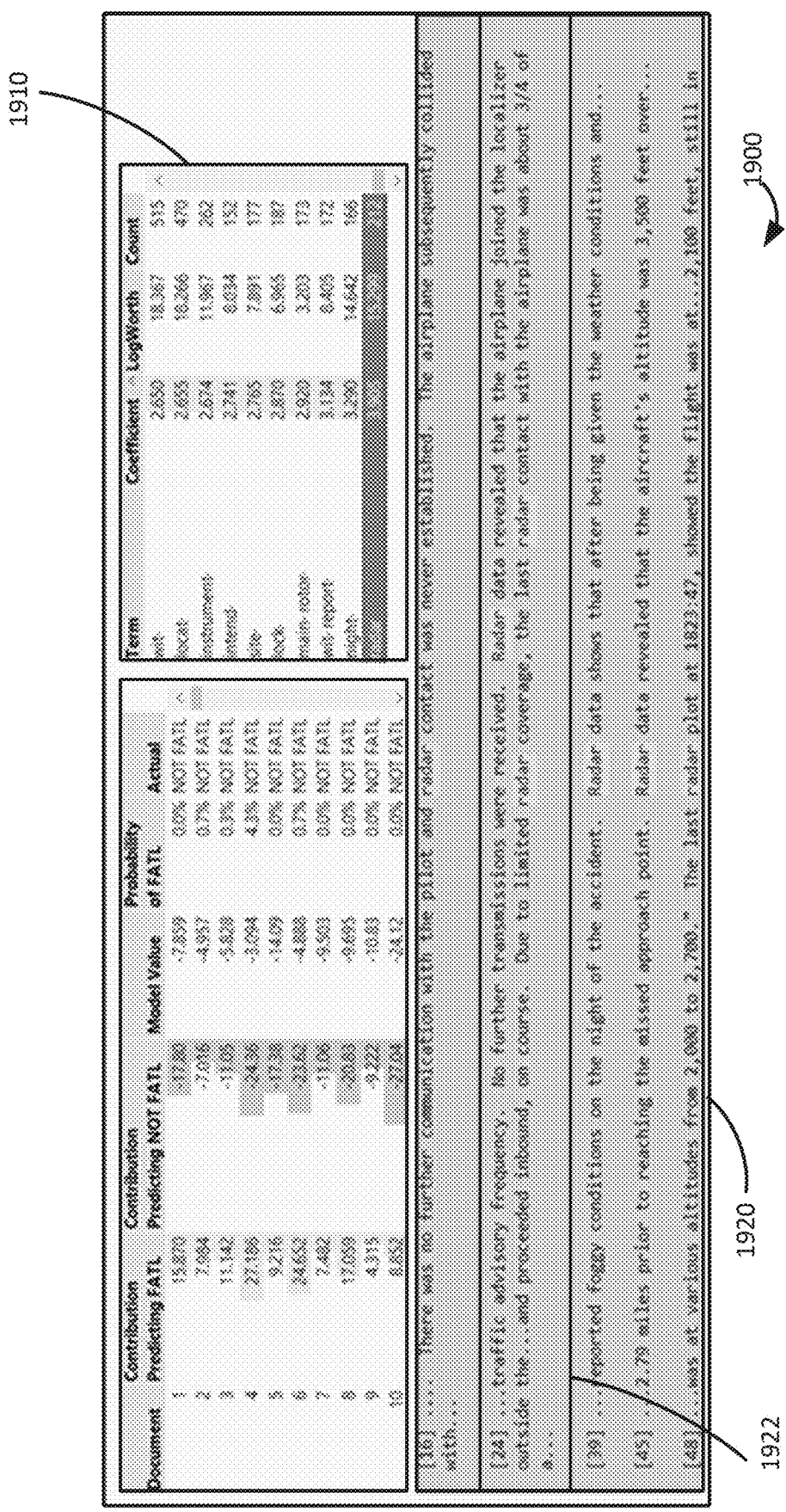
FIG. 19 illustrates an example graphical user interface for interactive text identification based on a selected term according to at least one embodiment of the present technology.

FIG. 19 illustrates an example graphical user interface 1900 for interactive text identification based on a selected term. In this example, a textual term "radar" is selected in terms window 1910 of the interactive report in graphical user interface 1900. Selecting the word in the terms window 1910 highlights that word in a sample of document text shown in document text window 1920. For instance, document sample 1922 is identified with the document identifier 24 and shows the term "radar" highlighted in teal three times within the document sample 1922. This could allow a user to understand a particular term's role in the model for making decisions about whether for instance to update the model by removing a term (e.g., removing "radar").

Figure 20:
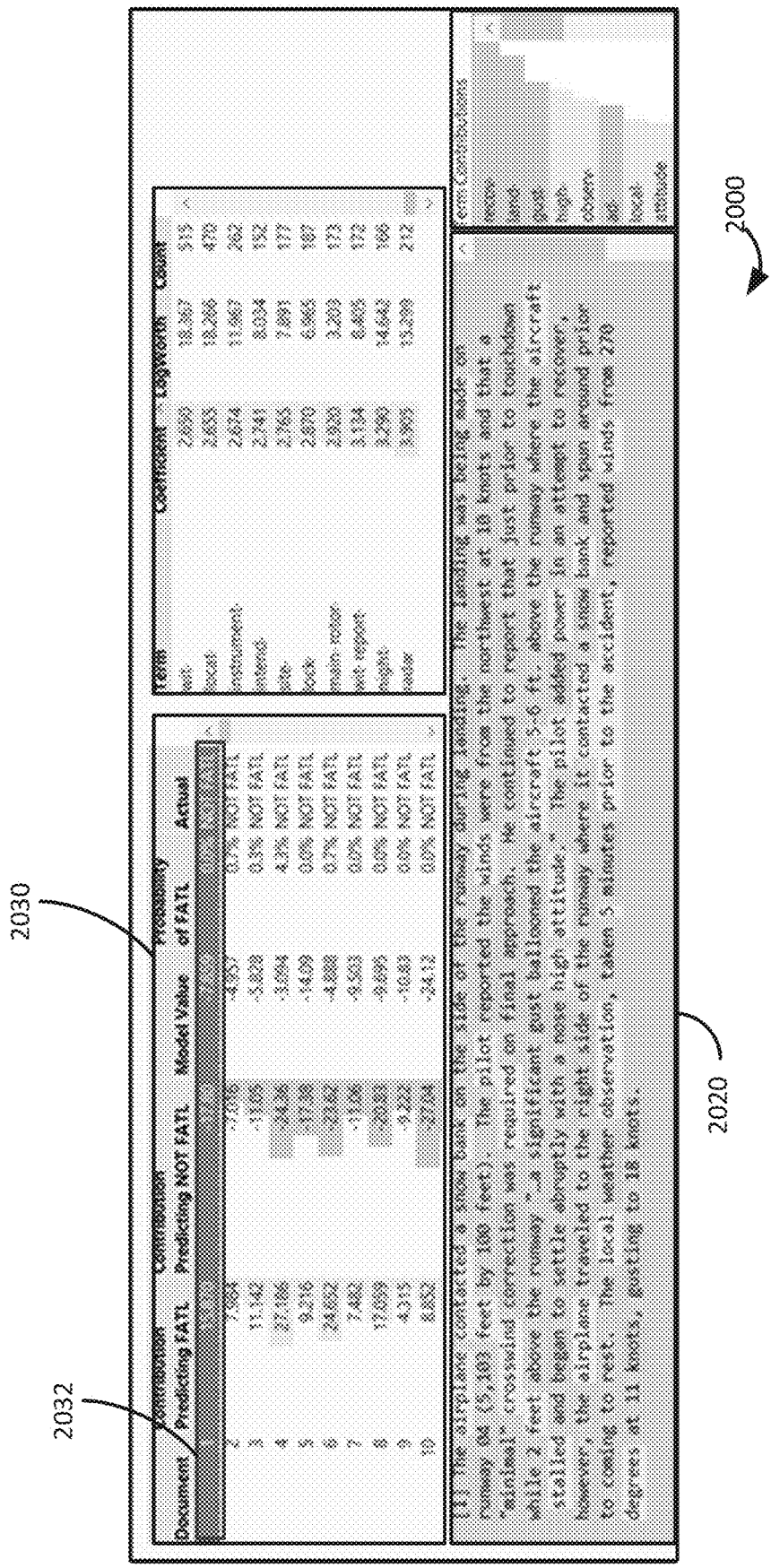
FIG. 20 illustrates an example graphical user interface for interactive text identification based on a selected document according to at least one embodiment of the present technology.

FIG. 20 illustrates an example graphical user interface 2000 for interactive text identification based on a selected document. In this example, selecting a document in the document report window 2030 gives more information about that document and the informative words in it. In this example, a user has selected a row 2732 in document report window 2030 selecting the document with identifier "1". As shown in the document text window 2020 a sample of the document associated with row 2732 is shown and the informative words are highlighted in purple or orange. As shown in the document report window, terms marked with orange indicate a contribution predicting FATL and terms marked with purple indicate a contribution predicting not FATL. Specific terms with those different predictive abilities are then highlighted a corresponding color in the document text window 2020. Document-level inspection can provide another avenue for a user to interpret the model and how it is applying to text for updating or changing a model.

In one or more embodiments, a computing system can generate multiple different models based on user selections. For instance, a computing system can generate an initial model from a first set of textual terms. The computing system can receive a user selection to indicate a second set of textual terms from the list of multiple terms. The second set of textual terms may comprise one or more terms different than the first set of textual terms. The updated model estimates a relationship between the one or more target values and the second set of textual terms.

Figures 21A, 21B, 21C:
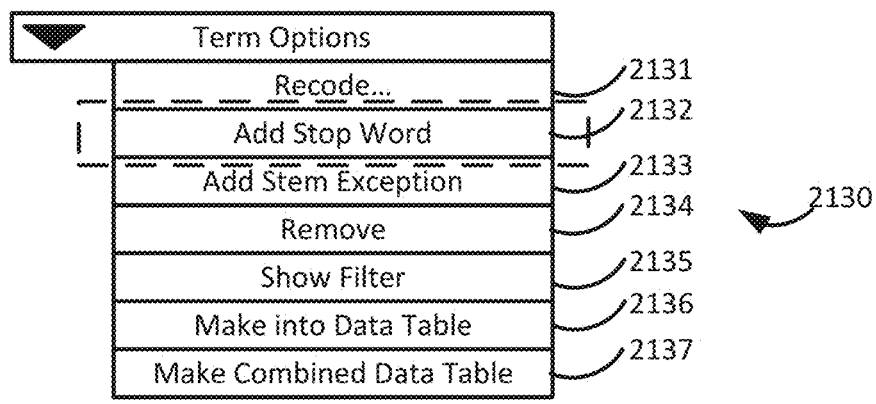
FIGS. 21A-C illustrate an example graphical user interface for changing a model term set for generating an updated model according to at least one embodiment of the present technology.

FIGS. 21A-C illustrate an example graphical user interface for changing a model term set for generating an updated model. FIG. 21A includes a window 2100 of a graphical user interface that lists informative terms to a model. The window includes the term "radar" in row 2101. Row 2101 is selected. FIG. 21B shows a menu 2130 for removing the term of the selected row 2101 from the model analysis. For instance, "add stop word" option 2132 is selected to ignore the selected term in the model analysis but not remove it from the list of possible terms for other models. Alternatively, the user could have selected the "remove" option 2134 to remove it from the list of possible terms for all compared models. FIG. 21C shows the window 2100 now shows a partial list of important words after automatically updating to remove "radar".

In this example, shown in FIG. 21A-21C the user updated a model by selecting to remove a term from the first set of textual terms. Alternatively, the user could have updated a model by adding textual terms instead (e.g., by adding terms shown in FIG. 17 or selecting add stem exception 2133 for augmenting the identified words according to a stem term). Alternatively, or additionally, a user can update the model interactively in other ways (e.g., based on a performance or features of an initial model). Finally, the user could have selected the "show filter" option 2135 to explore other changes to the model such as the options shown in FIG. 16.

FIG. 21B also shows options for greater interpreting the model. For instance, a "make into data table" option 2136 can allow a computing system to export terms into a data table. The "make combined data table" option 2137 may allow all the terms from multiple models to be put into a data table for interpreting the coverage of a set of models. The "recode" option 2131 may allow a user to more directly interact with how a model is functioning. For instance, terms can be recoded to remove terms from a model, group terms into phrases, or auto combine words into a single stem. Accordingly, term options in menu 2130 can allow a user greater visibility and control into model generation.

Figure 22:
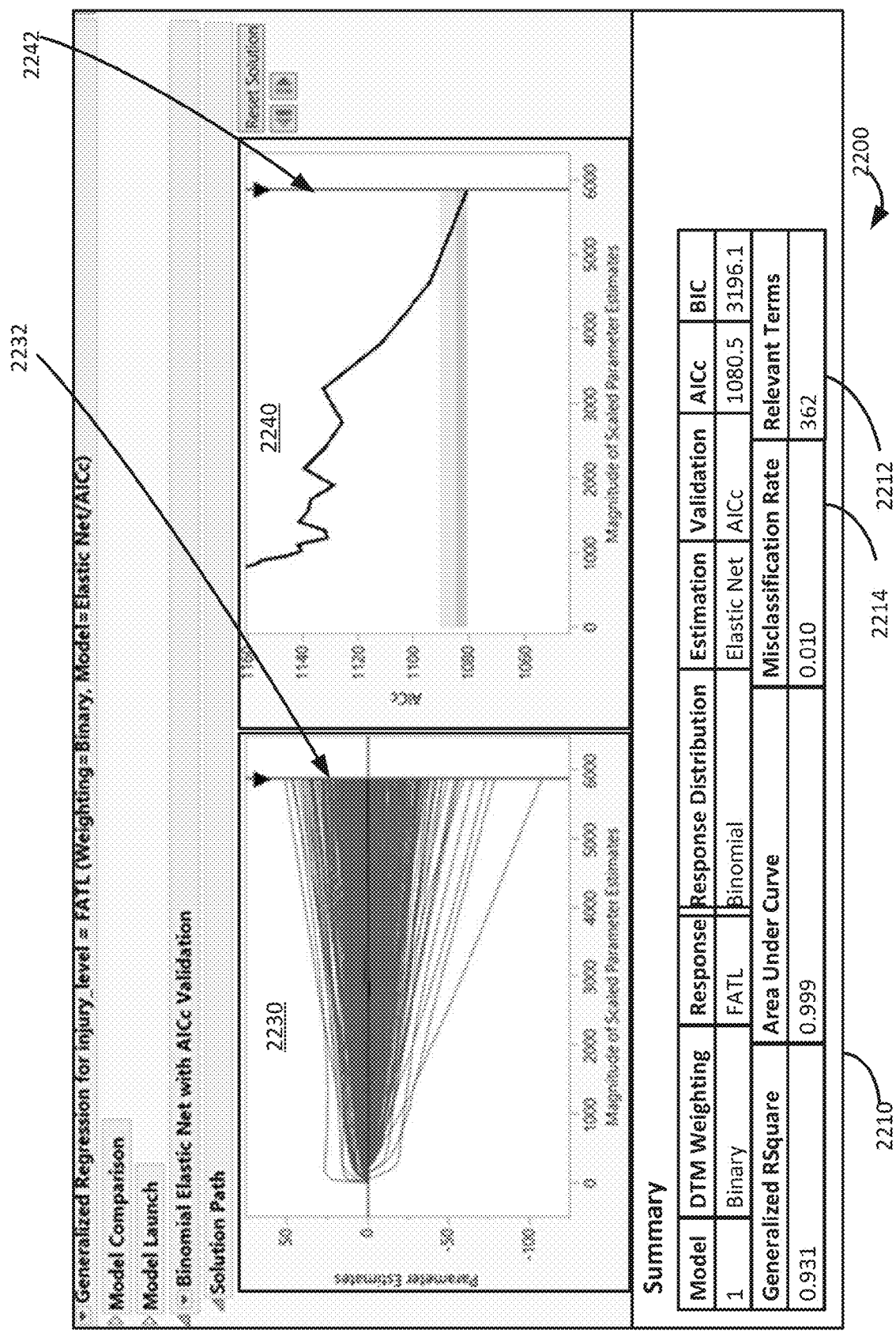
FIGS. 22-23 illustrate examples of graphical user interfaces for changing a graphical representation of a model according to at least one embodiment of the present technology.
Figure 23:
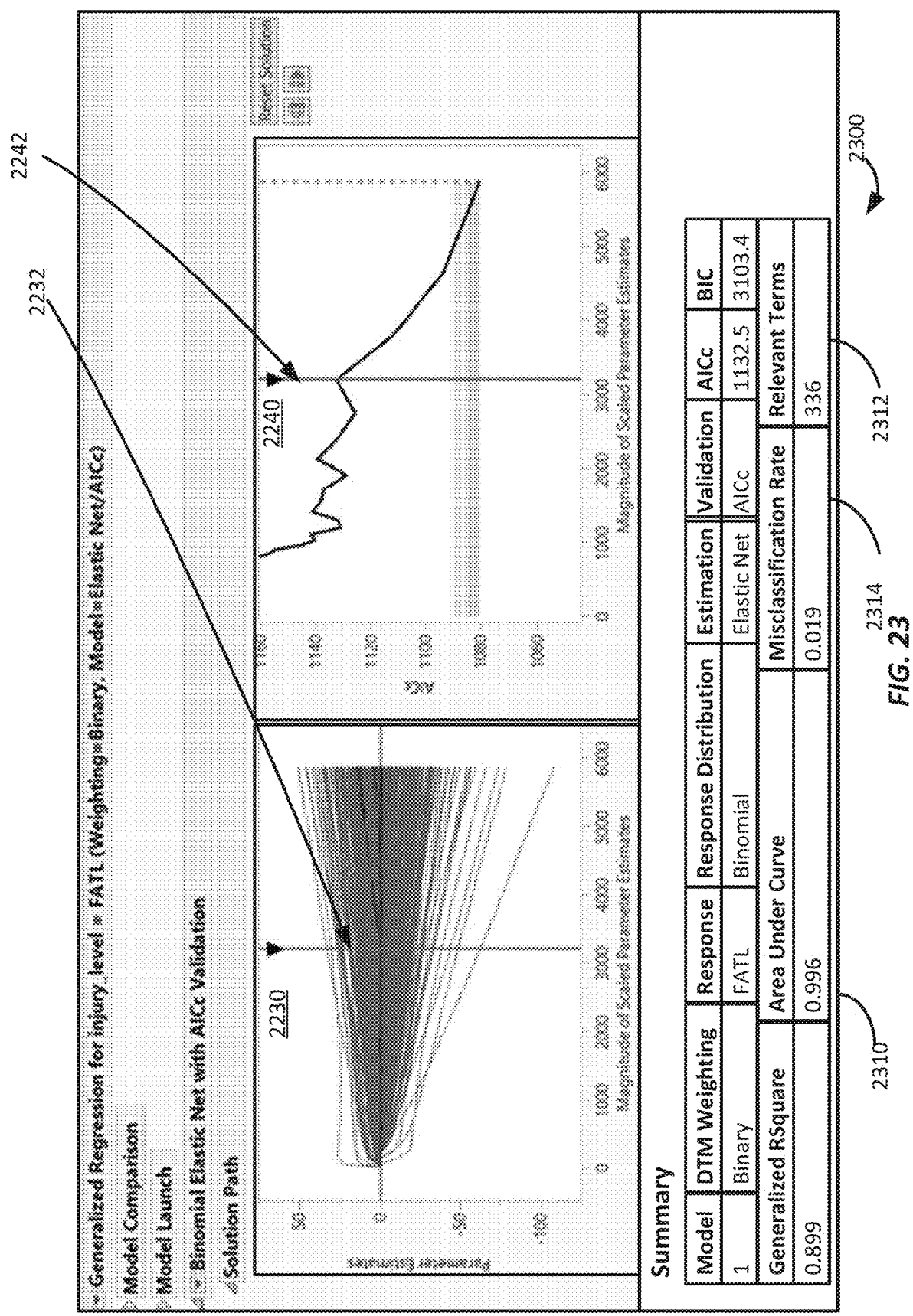

FIGS. 22-23 illustrate examples of a graphical user interface for updating a model by changing a graphical representation of a model. FIG. 22 shows a model summary section 2210 in a regression report 2200 for an initial model before updating the initial model. The summary section 2210 gives a summary of user selections and assessments of the initial model given the user selections. For instance, given the current initial model the relevant terms field 2212 of the summary section 2210 shows there were 362 relevant terms for this initial model. The summary section 2210 also shows performance information regarding the initial model such as a misclassification rate 0.010 in misclassification rate field 2214.

In this example, there are also two interactive graphs in the regression report 2300 showing plotted candidate solutions of the initial model, according to an estimation method. A first interactive graph 2230 shows a plot of the magnitude of scaled parameter estimates versus the parameter estimates. A second interactive graph 2240 shows a plot of the Akaike information criterions (AICs) given the magnitude of scaled parameters estimate. The initial model is currently using a magnitude of scaled parameters estimate of 6000 as shown by the respective slide bars 2232 and 2242 in each interactive graph.

In this example, the user moves the slide bar 2242 to a new position in the interactive graph 2240 to change the initial model to a subsequent updated model. In other words, a computing system receives an indication of a plotted point on the interactive graph 2240 corresponding to magnitude of scaled parameters estimate of approximately 3,200. This selection will move the slide bar 2232 in interactive graph 2230.

FIG. 23 shows the updates based on the user interaction with regression report 2200. The summary section 2310 shows updated values for this subsequent regression report 2300. For instance, the relevant terms field 2312 has updated to show there are now only 336 relevant terms. That means the model is simpler, but as shown by the other fields it may mean that the model has a worse fit. The misclassification rate field 2314 now shows a higher misclassification rate of 0.019 compared to 0.011 in the misclassification rate field 2214 of regression report 2200 in FIG. 22.

The user can keep making selections in one or more interactive graphs in a graphical user interface to generate different models and automatically see updates to the performance of those models. These results can be shown in different reports as shown in FIGS. 22 and 23 or they can be shown in one updating interactive report. This interactive feature enables more efficient updates of models and better control of a model by a user.

Figure 24:
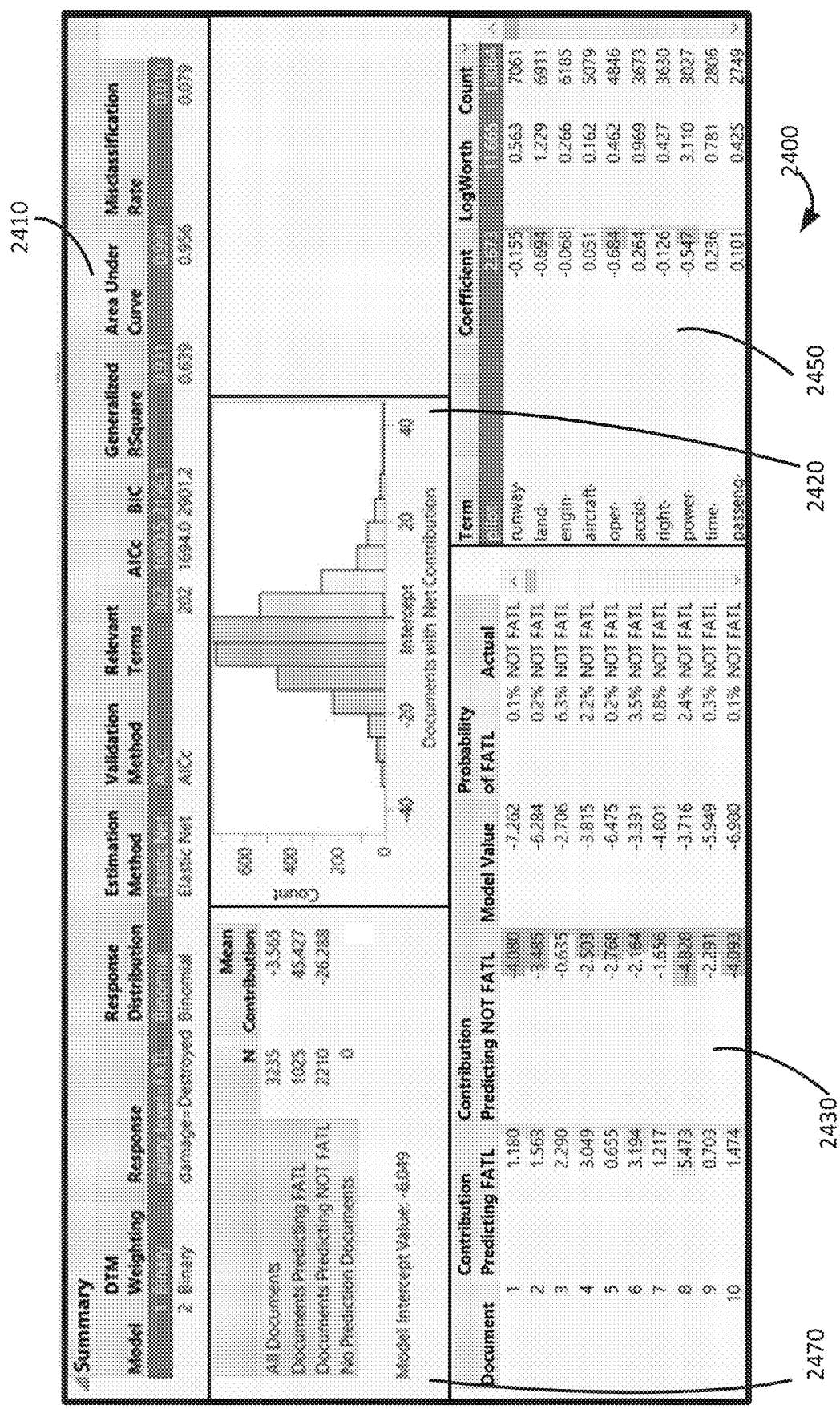
FIG. 24 illustrates an example of a graphical user interface for displaying interactive information pertaining to multiple generated models according to at least one embodiment of the present technology.

FIG. 24 illustrates an example of a graphical user interface for displaying interactive information pertaining to multiple generated models in one interactive report 2400. A summary section 2410 of the interactive report 2400 shows the summary of different generated models. In this example, the user can toggle between the different models by selecting a given model in the summary section. More details of the model will appear in the interactive report 2400. For example, in this case the user has selected in blue a model identified by model number 1. This interactive report includes information summarizing documents contributions to a response variable injury_level with a target value of Fatal ("injury_level=FATL").

For example, portion 2470 shows statistics regarding the documents such as the total number of documents (3,235) and the number of documents that are classified as contributing to a fatal (FATL) outcome (1,025) and a not fatal outcome (2,210). In this case all the documents were predicted for one of these two outcomes. Mean scores can be given to show the average contribution metric for each of these classifications. For instance, a mean of −3.565 for all the documents means in general that the documents were more likely to be classified as not fatal. In view the interactive report 2400, a user can understand that outcome better. For instance, the user can see that even though the contribution of fatal documents had a higher value (mean of 45.427) than the not fatal documents (mean of −26.288), there were more than double the amount of not fatal documents. The user can also view a histogram graph showing the range of contribution of the documents. For example, graph 2420 shows a histogram of documents separated based on a metric evaluation of the respective documents' contribution to the regression model. The model intercept value is at −6.049. Yellow bars indicate a count of documents above the intercept that contributed to a fatal prediction and blue bars in the graph 2420 indicate a count of documents below the intercept that contributed to a not fatal prediction.

If the user wants more understanding of how the dataset is influencing the generation of the model, the user can use the interactive report 2400 to explore individual documents and their contribution. In this example, the interactive report 2400 displays in a graphical user interface a document table 2430 showing documents that were used to train the model and information about the document. If the user selects a document (e.g., document 1 highlighted in blue), a terms table 2450 will update to show the top relevant terms in that document.

The user can easily toggle between different types of models with different features while maintaining visibility into the details of the dataset that trained the model. For example, the summary portion 2410 displays a model 2 with a different response variable that is interested in damage with target destroyed. The user can see how document 1 contributes to both these different variables and consider taking further action such as changing the training data set, changing relevant terms, and changing features of the model like the estimation method or validation method.

Figure 25:
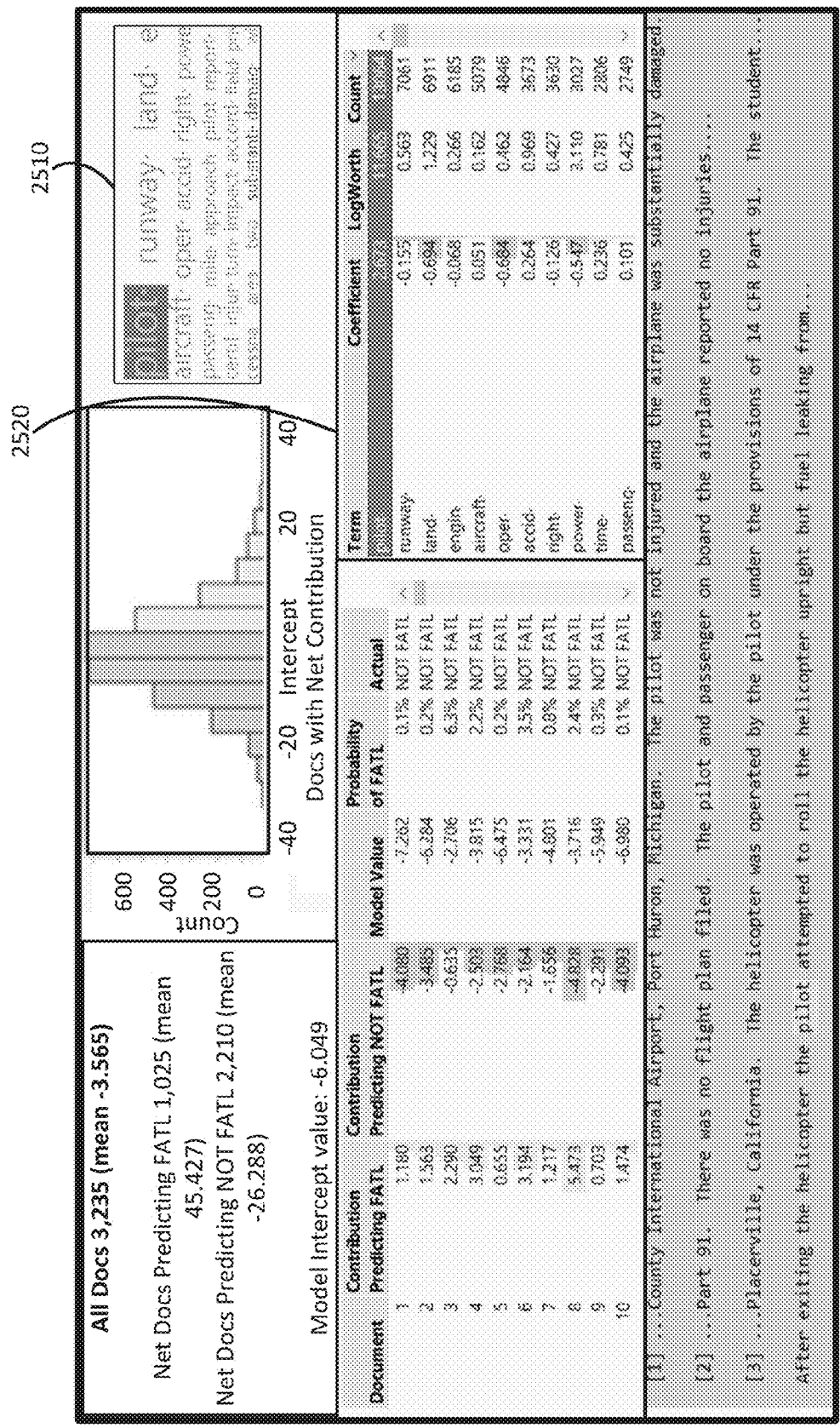
FIG. 25 illustrates an example of a graphical user interface with an interactive word cloud map according to at least one embodiment of the present technology.

In one or more embodiments, a graphical user interface displays the indication of the contribution, to a model (e.g., an initial or updated model), of respective textual terms, by displaying one or more graphical representation of a respective textual term's importance to the initial model. For example, FIG. 25 illustrates an interactive report 2500 for a graphical user interface with an optional interactive word cloud map 2510 for the data shown in FIG. 24. In the word cloud map 2510 textual terms of the model (e.g., a subset) is shown with the size of textual terms indicating an importance of a respective term to a selected model. The term "pilot" was most important to predicting a particular response in the model (e.g., predicting a FATL response), so it is shown largest in the word cloud map 2510.

In this example, the word cloud map 2510 is interactive such that a user can highlight a term in the word cloud map 2510 to display information about the term. For instance, a user has highlighted the term "pilot" in the word cloud map 2510. In response, the interactive report 2500 highlights the term "pilot" in the terms list window 2520 and displays document samples in the document sample window 2530 with the term pilot highlighted. As shown, the terms list window 2520 also is an example of indicating a terms contribution to a model. The terms list window 2520 comprises a listing of textual terms ranked based on the importance of the respective term to a model. In this example, the term "pilot" was most important to the model, so it is shown at the top of the list. A different ranking could be used with important terms at the bottom of the list or multiple lists with terms selected for a list based on different predictive abilities for target values (e.g., a list of orange terms contributing to predicting FATL and a list of blue terms contributing to predicting NOT FATL).

Accordingly, interactive reports such as the interactive report 2500 facilitates a connection between a graphical representation or document text that may be easy for a user to understand to more detailed metrics that are not as easily interpretable to the user. This can facilitate improved model updating by the user.

Figure 26:
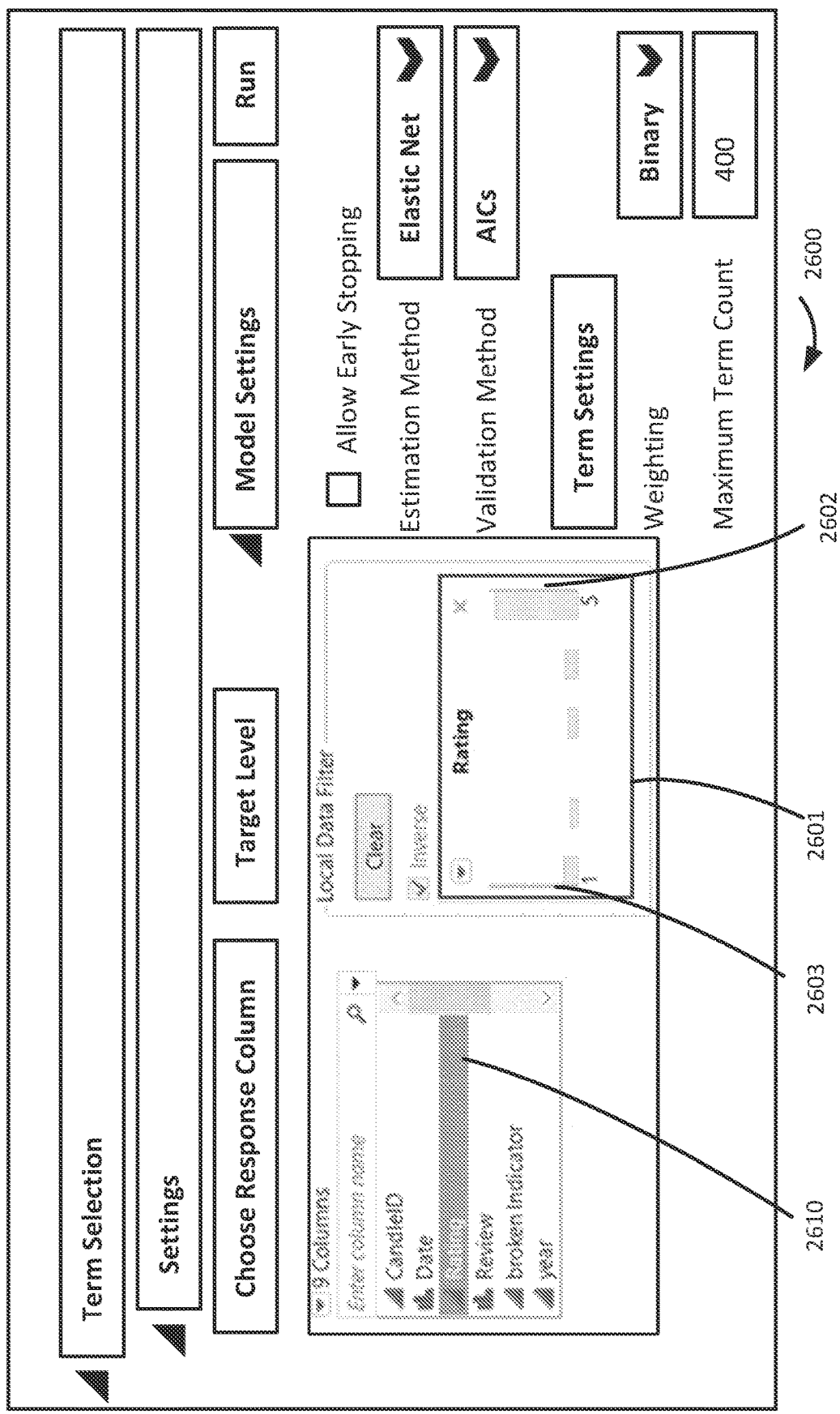

FIG. 26 illustrates an example graphical user interface 2600 for selecting multiple target values for model generation. In this example, a user has selected a numeric response or outcome for a regression model (rating 2610). A bar graph of the different amounts of documents with the different ratings is interactively displayed in the target response viewer 2601 in response to the chosen response type. Slide bar 2603 and slide bar 2602 can be used by the user to select a range for the one or more target variables. In this example, the entire range is selected to generate a model to predict target responses for the entire range of possible outcomes. However, the slide bars could be moved to pick a narrow range (e.g., ratings in the 2-4 ratings). Alternatively, individual bars could be selected to pick a particular target value or target values. In this way a user can filter the data set to focus on target values that may be more important to the user for predicting (e.g., lower rating reviews).

This example in FIG. 26 was given with discrete numeric target values, but other discrete categories could have been shown or the bar graph could have been a different type of graph if the candidate target values were continuous.

Figure 27A:
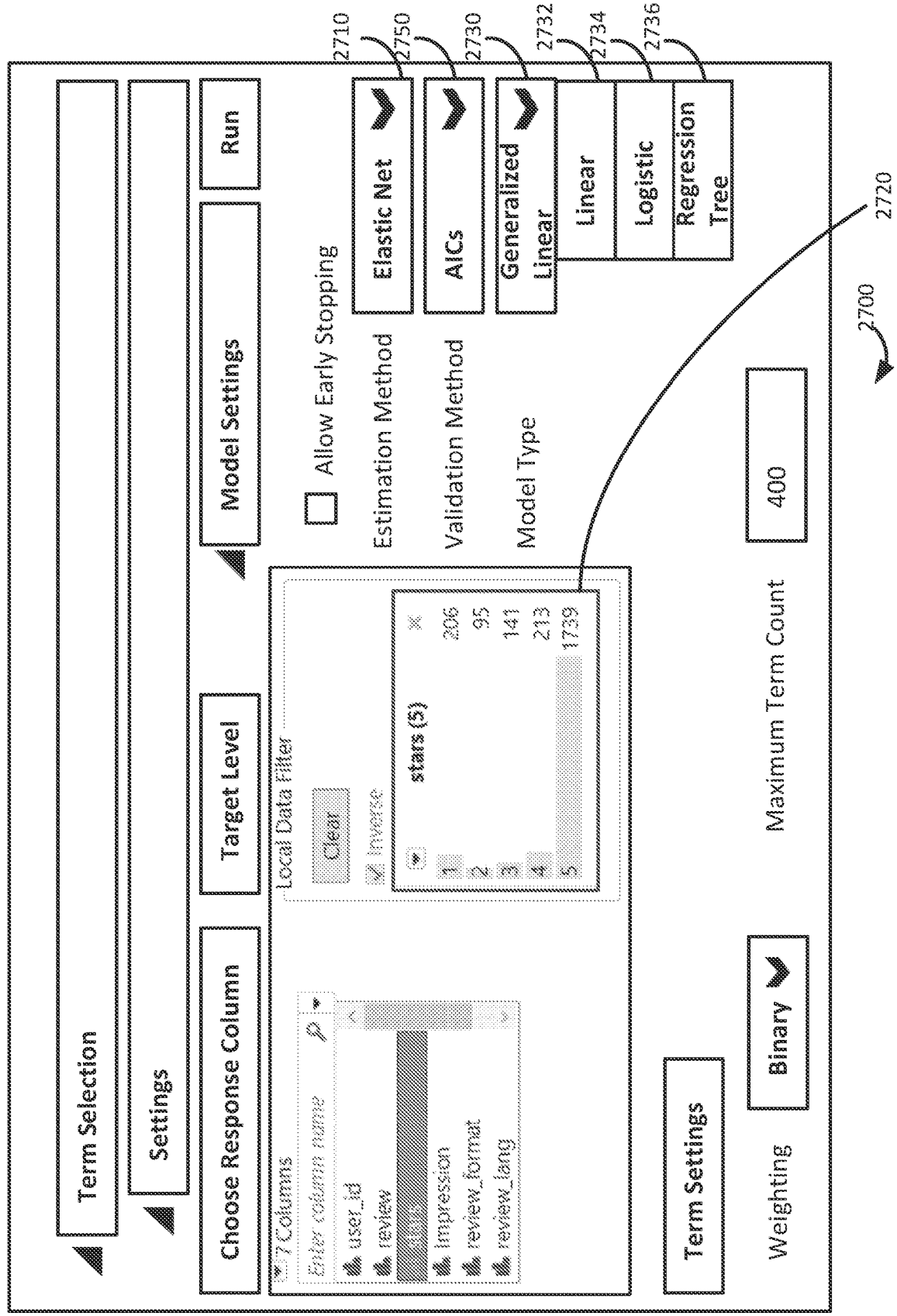

FIG. 27A illustrates an example graphical user interface 2700 for selecting multiple target values for model generation with a different orientation. For instance, FIG. 27A shows an alternative interactive display for possible target values for rating with a bar graph oriented differently than the bar graph in target response viewer 2601 of FIG. 1. It also includes a numerical count of reviews for each of the ratings. In both FIGS. 26 and 27A, numeric responses or outcome were selected, but discrete non-numeric response or outcomes could have been selected (e.g., FIG. 16 shows user selection of a non-numeric response or outcome for a regression model (injury_level response 1602)). Regardless of the display the user can make selections of model settings and term settings as described in more detail herein.

For instance, in the graphical user interface 2700, the estimation method type selected is an elastic net regularization estimation method (Elastic Net). However, the graphical user interface 2700 can use an estimation method menu 2710 such as a drop-down menu to display estimation options for an estimation method for a model of the set of regression models (e.g., an initial model or updated model). Elastic Net is shown as the default because it tends to choose groups of correlated predictors, and text can have words that tend to appear together making them highly correlated. However, the estimation method menu 2710 can be used to select other penalized regression techniques like a Least Absolute Shrinkage and Selection Operator (LASSO) estimation method and Smoothly Clipped Absolute Deviation (SCAD) estimation method. Further the estimation method menu 2710 could comprise different automated variable selection methods such as a stepwise variable selection like Forward Selection. Similarly, menu 2750 can be used to select among different validation methods such as ones described herein (e.g., BIC, cross-validation, k-fold). One of ordinary skill in the art will appreciate that the example term selection windows and interactive reports are merely for example and different orientations, different settings and different graphs could be presented as appropriate for the particular scenario or user to facilitate generation, comparison and interpretability of models.

Figure 27B:
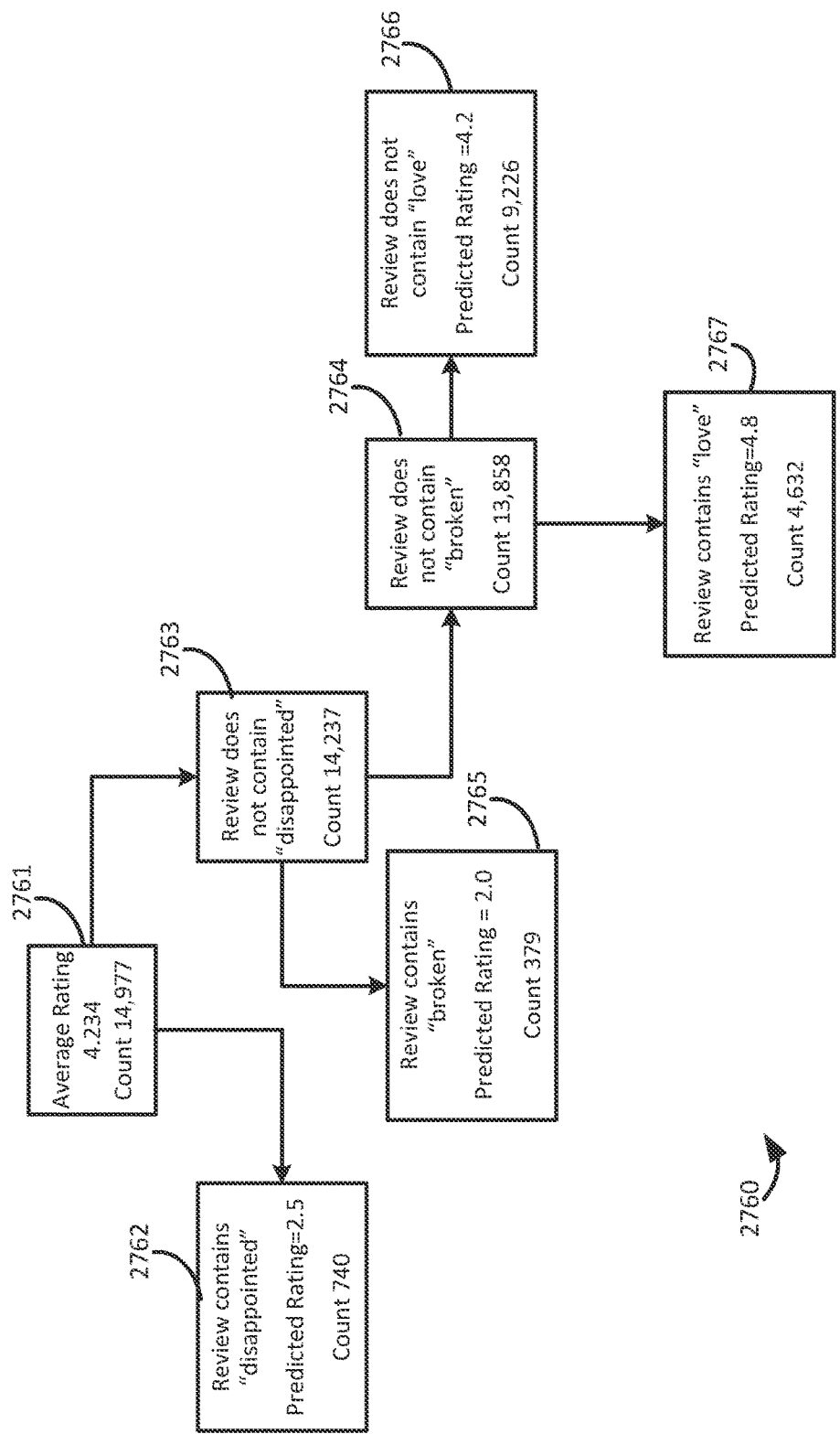
FIG. 27B illustrates an example of a regression tree model according to at least one embodiment of the present technology.

In FIG. 27A the user has selected the model type drop-down menu 2730 to pick a different model type than the default of generalized linear regression model. Different regression model types can then be displayed for the user to pick between (e.g., linear 2732, logistic 2734, and regression tree 2736). For instance, FIG. 27B, shows a flow diagram of an example of a regression tree model generated for a stars response. In this simple version of a regression tree model the words "disappointed" "broken" and "love" are used to predict an outcome for a particular review for 14,977 reviews. In this example, the average rating at tree item 2761 of the regression tree was a 4.234. If the review contains "disappointed" at tree item 2762, it is given a predicted rating of 2.5 according to the regression tree model, otherwise other words were examined under tree item 2763. If "broken" is present in the review a rating is given a 2.0 at tree item 2765. If "broken" is not present in the review, the predicted rating is given based on whether the review contains the word "love" from tree item 2764. If the review does not contain love, a predicted rating of 4.2 is given at tree item 2766. If the review does contain love a predicted rating of 4.8 is given at tree item 2767. This type of tree could be displayed to a user for comparing generated models with other statistics such as standard deviation, logworth, differences, etc.

In one or more embodiments, a computing system displays in a graphical user interface one or more representations of an initial model and one or more representations of an updated model in proximity for user comparison of one or more source data, model settings, or model assessments for differently generated models.

FIGS. 28A-B illustrates example graphical user interfaces for comparing multiple models. As shown in a summary window 2800 of a graphical user interface, a table summarizes features of different models generated in a regression set of models.

In this example, information summarizing four different models is shown in summary window 2800 of a graphical user interface. In summary window 2800, model settings 2810 are shown for comparison of four different models. For instance, while the models had the same response variable, response distribution, and validation method, some of the models differed in Document Term Matrix (DTM) weighting and estimation method. For instance, models 1, 2 and 3 used different DTM weights. Model 4 used the same DTM weight as model 2, but model 4 used a different estimation method of Lasso while model 2 used Elastic Net. For instance, the computing system may have received a user selection of different estimation options or DTM weightings for the models.

Additionally, in summary window 2800, model assessments 2820 are shown for comparison of four different models. In this example, performance metrics (including generalized RSquare and Root Average Square Error, RASE) are shown to provide metrics to assess the performance of the models. The user can then see in model assessments 2820 various metrics accessing the generated model according to the model settings 2810. These can provide a display to help a user understand tradeoffs in different models. For instance, maybe model 1 is a better model for a particular scenario because it has fewer relevant terms but not a significantly lower RASE score.

If a user wants to add additional models to the set, they can be further specified (e.g., in a graphical user interface 1700 in FIG. 17). A user can toggle between the summarized models in the summary window 2800 to see how the models compare. The user can also have direct access to each model that is fit, if the user wants more detail about the regression models fit.

FIG. 28B shows a window 2850 for a user to selectively explore more specific aspects of various methods in proximity in the same graphical user interface (e.g., by clicking on a particular drop-down window). For instance, additionally or alternatively, the computing system can display one or more performance metrics, one or more graphs, or one or more textual terms identified in the models as predictors of the one or more target values for user comparison of the model. For instance, FIGS. 23, 24 and 25 show example graphical displays for displaying source data such as information on terms in the model or information on documents used in producing the model, or graphs of model performance. These displays can be interactive for a user to generate an updated model either by changing an existing model or generating a new model with a unique identifier for comparison. These reports can be considered "live" in the sense that they are interactive to the user (e.g., an interactive JMP® report) and the user can modify a model or report directly from a graphical user interface.

Figure 29C:
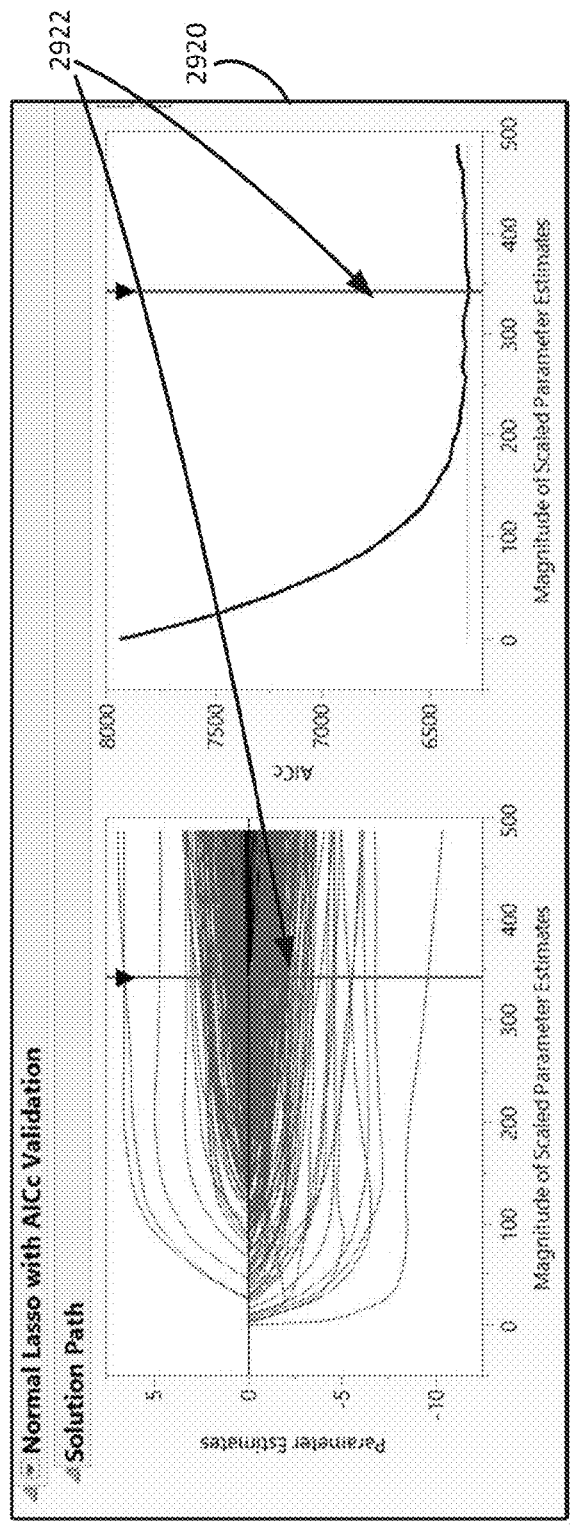

FIGS. 29A-E illustrate an example graphical user interface for changing a model by changing a graphical representation of a model. In these examples, identified textual terms are in one or more datasets associated with different electronic documents comprising text. FIG. 29A shows an example graphical user interface with a terms table 2900 for the top ten terms contributing to a negative contribution. FIG. 29B shows a graphical user interface 2910 with an example documents table 2916. The documents table 2916 shows a prediction for each of the documents based on metrics regarding the positive contribution and negative contribution to the document. For instance, a row for document 1 is selected by the user. The interactive graphical user interface highlights document 1 in blue. Document 1 is predicted to have a response of 5.071 based on a 0.744 positive contribution from terms of the document 1 and a −0.033 negative contribution from terms of the document 1. The actual outcome for the document was 5. The graphical user interface is interactive and shows a terms table 2912 of the top-ranking terms in the document for a negative contribution. A text viewer 2914 shows a sample text of document 1. Words that positively contributed are orange and underlined. Terms that negatively contributed are shown in purple and italicized.

Figure 29D:
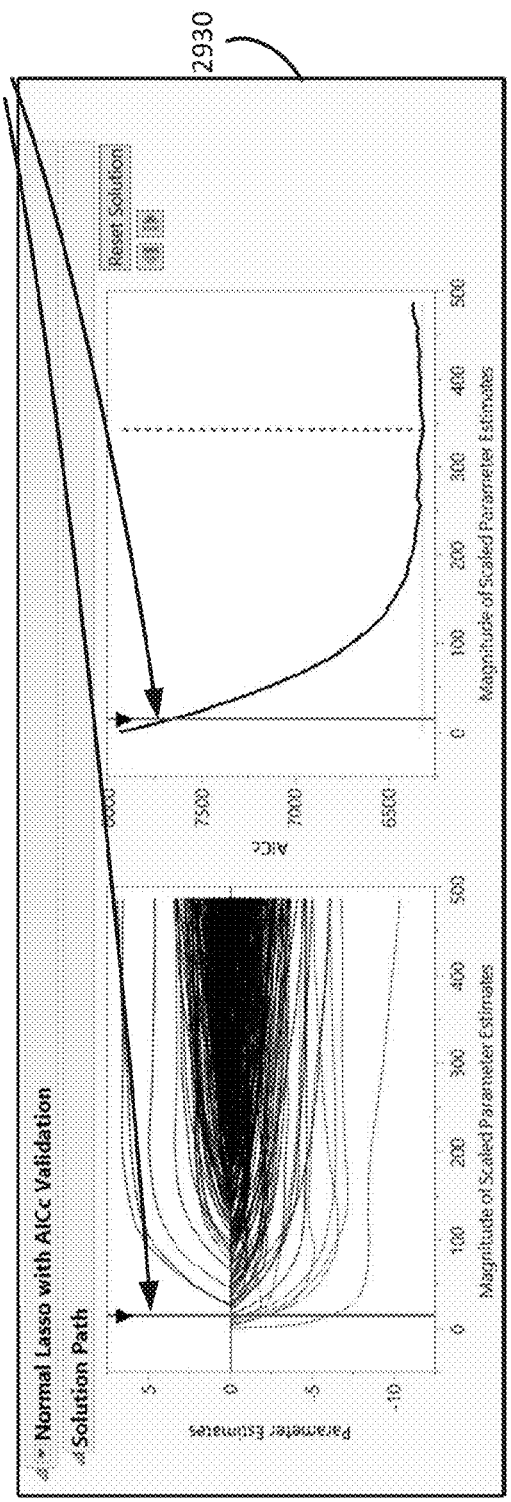
Figure 29E:
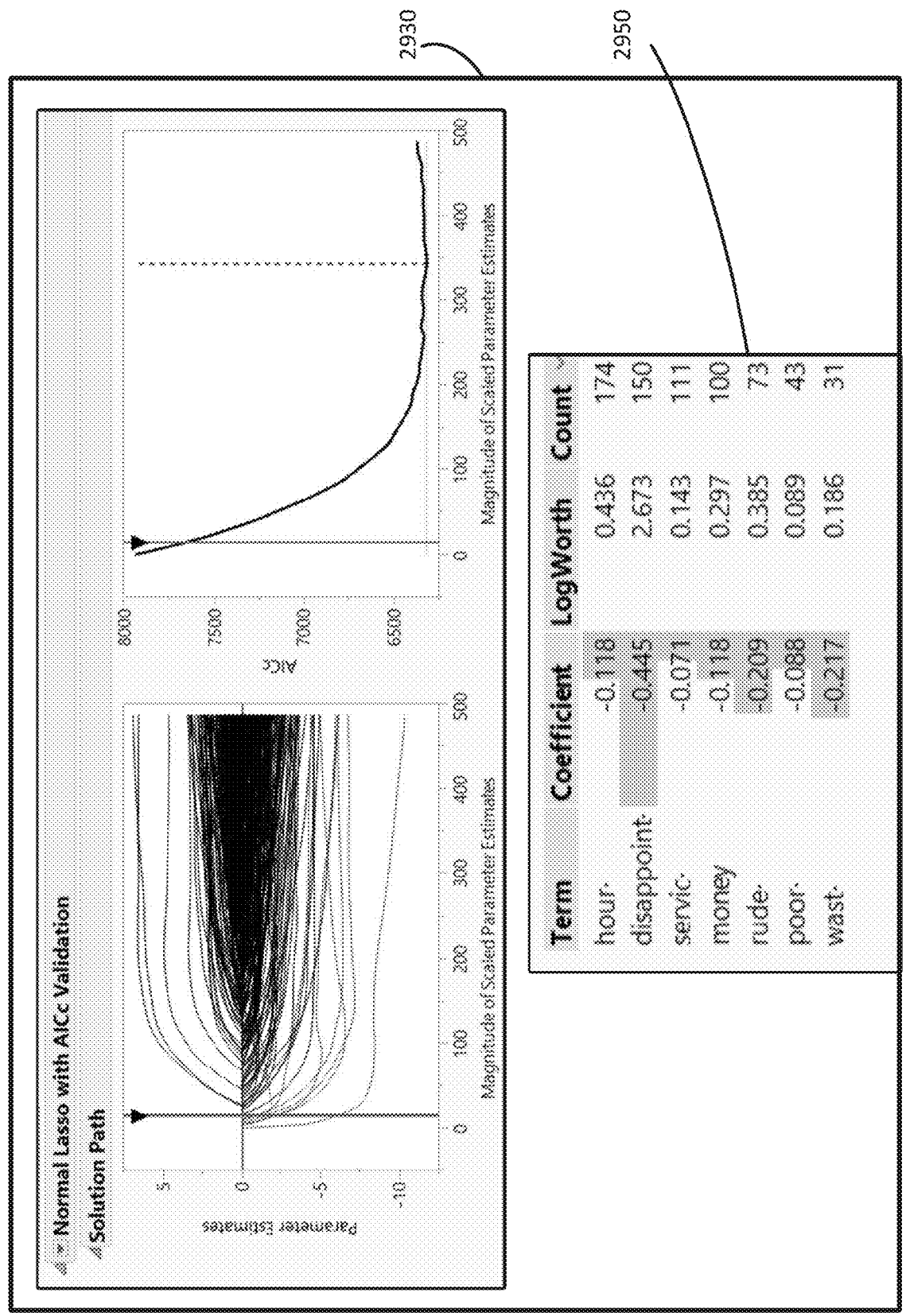

FIG. 29C shows an example solution path graphs for a model in graphical user interface 2920. Interactive solutions path graphs are described in more detail with respect of FIG. 22. For instance, bar 2922 is displayed in the graph based on the number of relevant terms. In this example, the user decided to update the model according to this solution path of FIG. 29C to use a much simpler regression model with fewer relevant terms. FIG. 29D shows an updated graphical user interface 2930 with the bar 2922 moved by the user on the graph from its original dotted location. The reports regarding the models will update automatically according to this change. For instance, FIG. 29E shows that the graphical user interface 2930 could also comprise an updated terms table 2950. When the model changed to limit the number of relevant terms the terms table 2950 is different and indeed there were not even ten relevant terms to the negative contribution under this new restrictive model. The interactive interface makes finding relevant terms in the documents much quicker and easier, which helps with interpretability of the underlying models.

Figure 30:
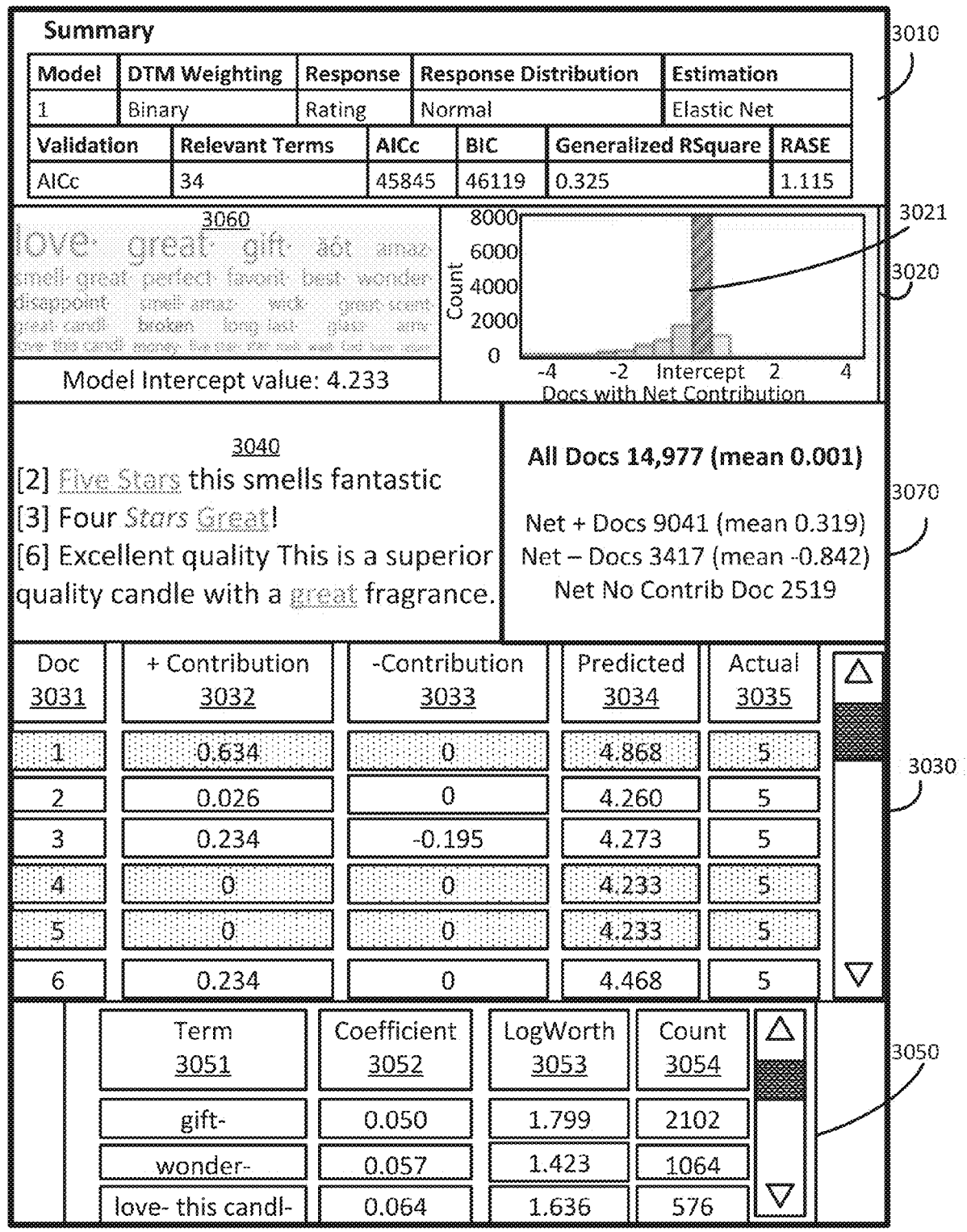
FIG. 30 illustrates an example graphical user interface with interactive document information according to at least one embodiment of the present technology.

FIG. 30 illustrates an example graphical user interface 3000 for interactive document information. In this example, candidate predictors for a regression model comes from textual terms in one or more datasets associated with different electronic documents comprising text. A summary section 3010 comprises information summarizing features of the regression model (e.g., a selected response variable to the textual terms for a rating output).

In one or more embodiments, a computing system displays in a graphical user interface an interactive graphical representation summarizing all the documents' contribution to one or more aspects of the initial model. For example, portion 3070 shows statistics regarding the documents such as the total number of documents (14,977) and the number of documents that are classified as contributing to a positive contribution (9,041), negative contribution (3,417), and no contribution classification (2,519). Mean scores can be given to show the average contribution metric for each of these classifications. For instance, a mean of 0.001 for all the documents means in general that the documents were more likely to be classified as a positive contribution, but only slightly.

As another example, graph 3020 shows a histogram of documents separated based on a metric evaluation of the respective document's contribution to the regression model. The model intercept value is at 4.233. In this example, a user has selected a bar 3021 of the histogram and it appears a darker and different color with a stripped pattern in the display to indicate the selection. The computing system could have received a graph selection of one or more other points in an interactive graphical representation. Further, the selection could be depicted in other ways such as bolding the box or showing only selected points or bars. This graphical user interface 3000 is interactive and shows a response to the selected bar 3021. For instance, textual terms pertaining to these identified documents in the bar 3021 are also displayed in portion 3050 of the graphical user interface 3000. Portion 3050 includes a terms column 3051 that shows terms in the identified document set that contributed to a positive contribution. A coefficient column 3052, log worth column 3053 and count 3054 is displayed to provide greater insight to the user into the selection of those terms as relevant terms.

A word cloud in 3060 can also be used to represent textual terms to a user. This can help with user interpretability of the regression model in particular segments of the dataset in which the model was trained on or applied to. For instance, in this example, a user of the graphical user interface 3000 can visually see that a word such as "love" or "great" has greater weight in predicting a five-star rating than even the phrase "five star" due to its larger size and color.

In this example, the graphical user interface 3000 also displays a table 3030 showing an indication of identified documents of the different electronic documents by graying out other documents in the table 3030. Alternatively, identified documents could be highlighted in other ways such as displaying information pertaining to identified documents highlighted in a color. The table 3030 shows the identifier of identified documents in document column 3031 and the contribution to the one or more target values. For example, there is a metric for each document of the table 3030 indicating a value for the positive contribution column 3032 or negative contribution column 3033 toward a response output in the model. In this case the response output is a predicted rating response according to the model in predicted column 3034. An actual rating response in actual column 3035 is shown to consider the performance of the model. In this example, documents identified in the document column 3031 as "2" "3" and "6" are identified documents, and documents identified in the document column 3031 as "1", "4" and "5" are grayed out. Visual distinctions like this may help the user focus on selected documents according to the selection in graph 3020.

In one or more embodiments, in response to the document selection of a displayed or identified document, a computing system can display, in a graphical user interface, text in the identified document comprising an indication of the contribution of one or more textual terms of the text to the one or more target values. For instance, as shown in portion 3040 of graphical user interface 3000, text of documents denoted with a "[2]", "[3]" and "[6]" are shown with textual terms contributing to the rating according to the model shown in orange for a positive contribution and purple for a negative contribution. For instance, text identified from document "[2]" in the portion 3040 includes the phrase "Five Stars" indicating a likely Five Star review leading to a predicted rating of 4.260 in predicted column 3034 of table 3030. In contrast, as shown by text identified from document "[3]" in the portion 3040 "stars" by itself may negatively contribute to a Five Star review, but the term "great" may positively contribute to a Five Star review, such that the model still predicts close to a likely Five Star Review (4.273 in predicted column 3034 of table 3030). However, the model weights both a positive contribution (0.234) and a negative contribution (−0.195) for that text with a predicted score of 4.273, which is not as close as if the review simply said "great" as shown by text identified from document "[6]" in the portion 3040 with a predicted review of 4.468 in predicted column 3034 of table 3030. The highlighted terms in the text may increase the interpretability of the model. For instance, in providing this display the user may gain greater insight into the model and determine that Four Stars Great should not lead to a Five Star rating. The user can then update the model.

Figure 31:
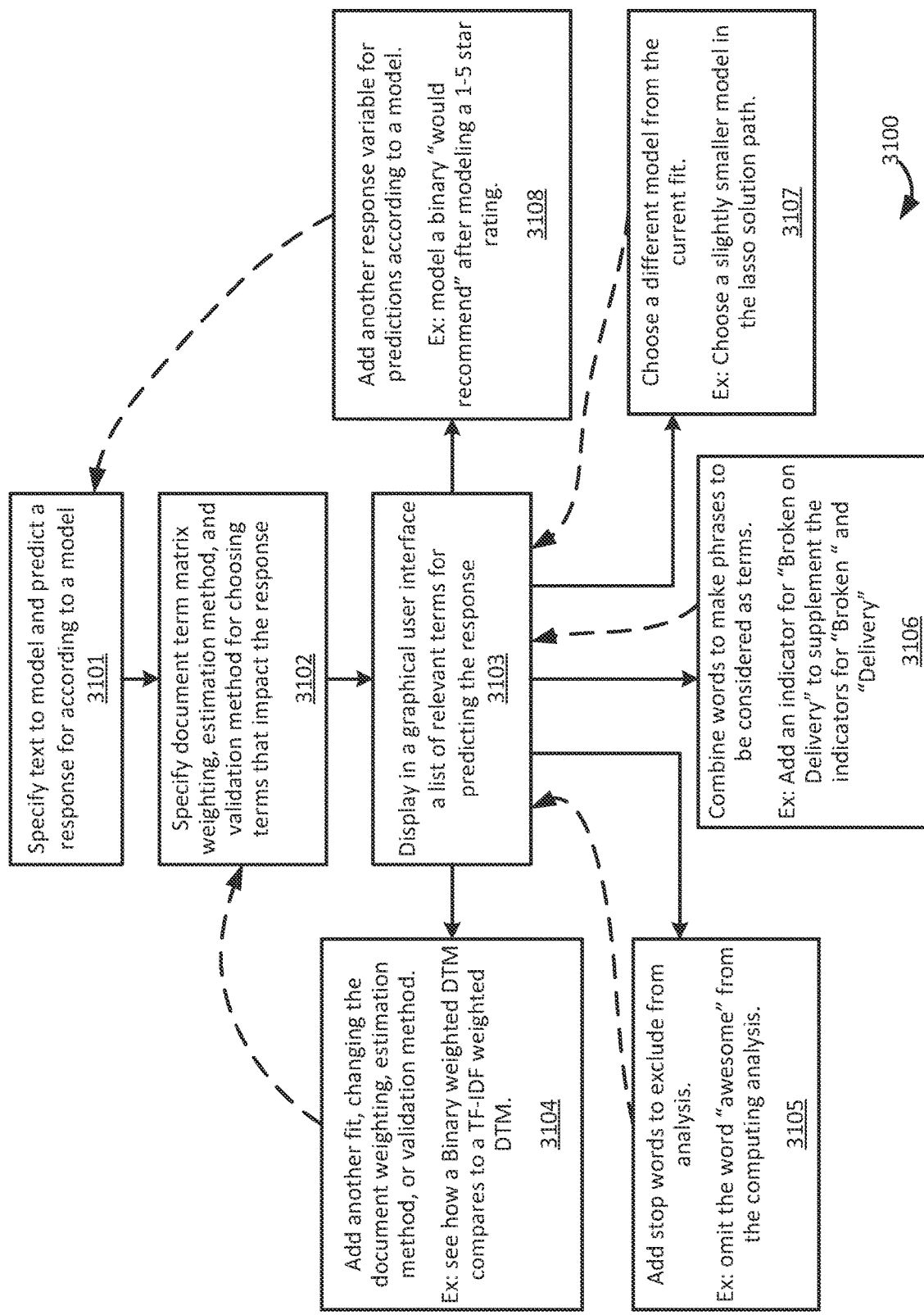
FIG. 31 illustrates an example flow diagram for an interactive graphical user interface according to at least one embodiment of the present technology.
Figure 3:
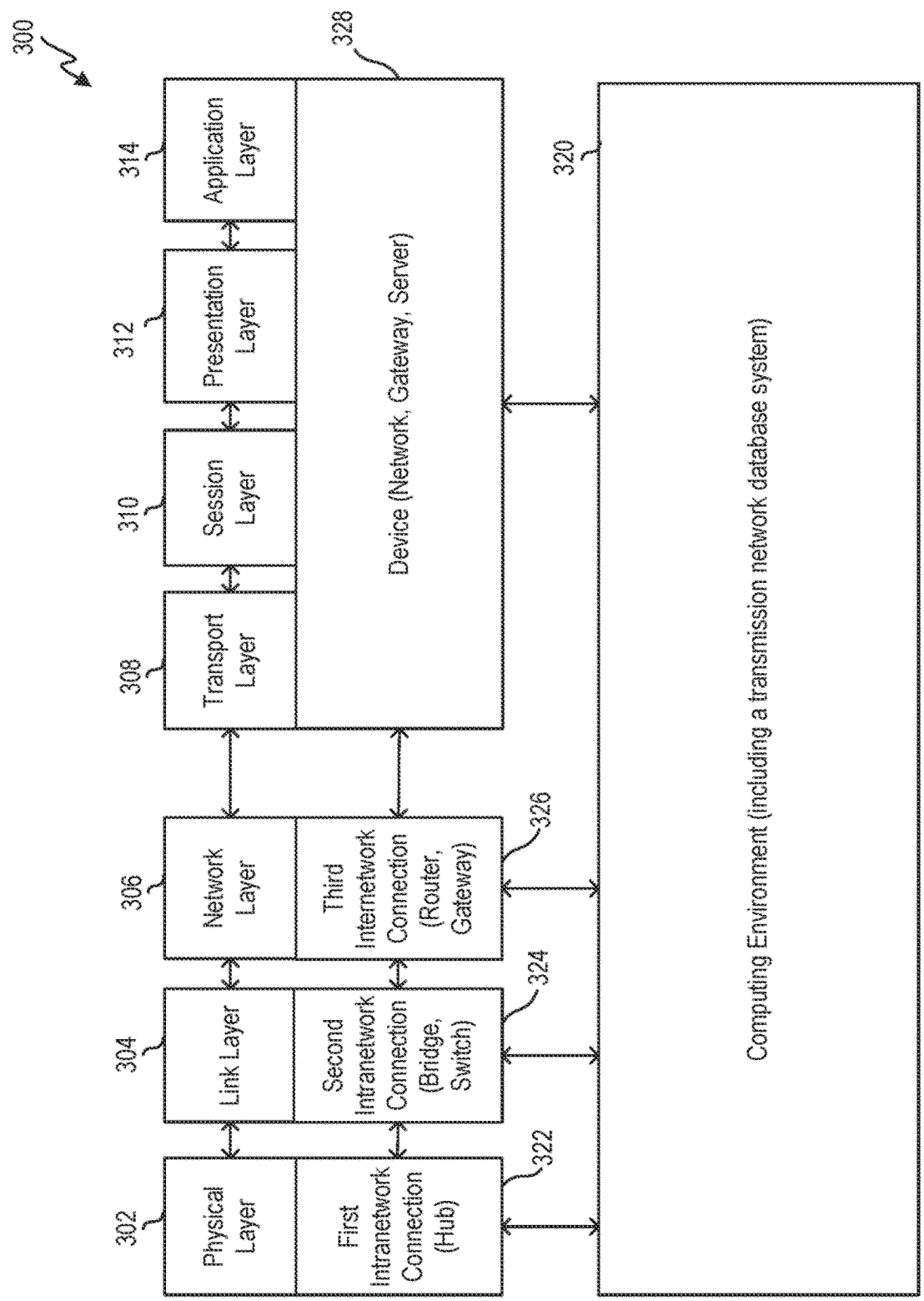

FIG. 31 shows a flow diagram 3100 for an example in which the user interacts with an interactive graphical user interface (e.g., a graphical user interface described herein) to analyze text. In this example, a computing system (e.g., a computing system described herein) has in an operation 3101 specified the text to model (e.g., using a regression model) and predict a response to the text according to the model (e.g., a number of stars assigned to a text review on a five-star rating). The computing system can specify the text in response to user input (e.g., a user could have specified a column or row of text in a dataset to analyze). In an operation 3102, the computing system specifies information for generating choosing terms that impact the response in the model (e.g., in response to user input or default values for selecting a document term matrix weighting, an estimation method and a validation method). In an operation 3103, the computing system displays in a graphical user interface a list of relevant terms for predicting a response. For example, the graphical user interface may show that "broke"

has a large negative coefficient in the model, and the graphical user interface can be interactive such that a user can look at documents with "broke" in the text and see that those documents also tend to have "delivery" as an important term influencing the model for understand that reviews where a product is broken on delivery is likely to be classified with a low star rating.

The user can interact with the graphical user interface to explore other models, influence models, and further analyze the text. For instance, in an operation 3104, the computing system adds a model fit by changing a document weighting, estimation method or validation method for the model. Having different fits in a single window makes it much easier to compare, for instance, the quality and interpretation of candidate models. For example, a user can select to add another model to see how a binary weighted document term matrix (DTM) compares to a term frequency-inverse document frequency (TF IDF) weighted DTM. In the case that another model is added, the computing system could return to an operation 3102 to specify features of that additional model.

Additionally, or alternatively, a model may not be added, but simply updated. For instance, in an operation 3105, the computing system can add stop words to exclude certain terms from analysis of one or more generated models. For example, the computing system can omit the term "awesome" from the computing analysis in response to a user indication to exclude this term. In an operation 3106, the computing system can combine words to make phrases to be considered as terms. For example, a user can indicate to add a term "Broken on Delivery" to supplement or replace terms "Broken" and "Delivery" considered in isolation by a model. In an operation 3107, the computing system can choose a replacement model from the current fit by choosing a slightly smaller model in a lasso path. In each of these operations, the graphical user interface can be updated to reflect these changes in an operation 3103.

Additionally, or alternatively, a computing system may add complexity to the modeling by adding another response variable for predictions in an operation 3108. For example, a user may specify to model a binary "would recommend" after modeling the 1-5 star rating. In this case, the user may select the same or different text for modeling the additional recommend response as the star rating response in the operation 3101 or may make changes to the modeling in the operation 3102.

The operations 3104-3108 can be performed in any order and simultaneously (e.g., if different users are provided a shared display). According, one or more embodiments provide a graphical user interface that makes it easier for a user to specify a model and easier to produce the model (e.g., easier to combine the document term matrix with specified response and fit a model). One or more embodiments provide an interactive report that helps with interpretability of model and summarizing relevant indicators of models to help a user compare, update, and select models for particular scenarios.

What is claimed is:

1. A computer-program product tangibly embodied in a non-transitory machine-readable storage medium for a graphical user interface that is interactive, the computer-program product including instructions operable to cause a computing system to:
   receive as candidate predictors, for a set of regression models, a list of multiple textual terms, wherein the list of multiple textual terms is for computer identification in one or more datasets, and wherein each of the one or more datasets are associated with different electronic documents comprising text;
   receive initial user selections, in the graphical user interface, of:
      a first set of textual terms comprising multiple candidate predictors from the list of multiple textual terms;
      a response variable for a response, of an initial model for the set of regression models, to input to the initial model, wherein the input comprises one or more members of the first set of textual terms; and
      one or more target values for the response variable;
   generate the initial model that estimates a relationship between the one or more target values and the first set of textual terms;
   display in the graphical user interface:
      a representation of the performance of the initial model for user comparison of models of the set of regression models; and
      an indication of a contribution, to the initial model, of respective textual terms of a subset of the first set of textual terms, wherein the subset of the first set of textual terms is identified in the initial model as predictors of the one or more target values;
   receive a subsequent user selection, in the graphical user interface, to change an aspect of the initial model;
   generate, based on the subsequent user selection, an updated model for the set of regression models;
   display, in the graphical user interface, an indication of an identified document of the different electronic documents and the identified document's contribution to the one or more target values;
   receive a document selection of the identified document displayed in the graphical user interface; and
   in response to the document selection of the identified document, display, in the graphical user interface, text in the identified document comprising an indication of a contribution of one or more textual terms of the text to the one or more target values.

2. The computer-program product of claim 1, wherein the instructions are further operable to cause the computing system to display, in the graphical user interface, the indication of the contribution, to the initial model, of respective textual terms of a subset of the first set of textual terms by applying:
   a first visual identifier pattern to a first term of the subset of the first set of textual terms indicating a first predictive ability for predicting the one or more target values; and
   a second visual identifier pattern to a second term of the subset of the first set of textual terms indicating a second predictive ability for predicting the one or more target values; and
   wherein the first visual identifier pattern and the second visual identifier pattern are different to indicate different predictive abilities.

3. The computer-program product of claim 2, wherein the first predictive ability relates to a predictive ability to positively indicate a particular target value of the one or more target values, and wherein the second predictive ability relates to a predictive ability to negatively indicate away from the particular target value of the one or more target values.

4. The computer-program product of claim 2, wherein first visual identifier pattern and the second visual identifier pattern are different in color.

5. The computer-program product of claim 1, wherein the instructions are further operable to cause the computing system to display in the graphical user interface:
  a representation of the performance of the updated model for user comparison of the updated model with the representation of the performance of the initial model, wherein the representation of the performance of the updated model comprises:
    one or more performance metrics,
    one or more graphs, or
    one or more performance metrics and one or more graphs; and
  one or more textual terms of the list of multiple textual terms identified in the updated model as predictors of the one or more target values.

6. The computer-program product of claim 1,
  wherein the instructions are operable to cause the computing system to receive the subsequent user selection by receiving an indication of a second set of textual terms from the list of multiple textual terms;
  wherein the second set of textual terms comprises at least one term different than the first set of textual terms; and
  wherein the updated model estimates a relationship between the one or more target values and the second set of textual terms.

7. The computer-program product of claim 6, wherein user selection of a second set of textual terms indicates to remove a term in the first set of textual terms or to add textual terms to the first set of textual terms.

8. The computer-program product of claim 1,
  wherein the graphical user interface displays an identified phrase or virtual term comprising multiple textual terms from the list of multiple textual terms; and
  wherein the instructions are operable to cause the computing system to receive the subsequent user selection by receiving an indication to add or remove the identified phrase or virtual term to the list of multiple textual terms.

9. The computer-program product of claim 1, wherein the instructions are operable to cause the computing system to:
  display regression model types for user selection in the graphical user interface for the initial model or the updated model, wherein the regression model types comprise one or more of linear regression models, logistic regression models, or regression tree models; and
  receive the initial user selections by receiving a regression model type of the regression model types.

10. The computer-program product of claim 1, wherein the instructions are operable to cause the computing system to:
  display regression model types for user selection in the graphical user interface for the initial model or the updated model, wherein the regression model types comprise one or more of linear regression models, logistic regression models, or regression tree models; and
  receive the subsequent user selection by receiving an indication to change a regression model type of the initial model to a different regression model type of the regression model types.

11. The computer-program product of claim 1, wherein the instructions are operable to cause the computing system to display in the graphical user interface one or more representations of the initial model and one or more representations of the updated model in proximity for user comparison of one or more of source data, model settings, or model assessments for differently generated models.

12. The computer-program product of claim 1,
  wherein each of the one or more datasets are associated with different text-based data sequences; and
  wherein the instructions are operable to cause the computing system to:
    receive a term selection in the subset displayed in the graphical user interface; and
    in response to the term selection, display in the graphical user interface the selected term in a text-based data sequence of the different text-based data sequences.

13. The computer-program product of claim 1, wherein the instructions are operable to cause the computing system to:
  display, in the graphical user interface, an interactive graph that comprises plotted solutions of the initial model according to an estimation method; and
  receive the subsequent user selection by receiving an indication of one or more plotted points on the interactive graph.

14. The computer-program product of claim 1,
  wherein the list of multiple textual terms is generated from word parts identified in the one or more datasets that are prioritized based on a frequency of the word parts identified in the one or more datasets; and
  wherein the instructions are further operable to cause the computing system to determine the first set of textual terms by:
    receiving an indication of an amount of textual terms via the graphical user interface; and
    selecting the first set of textual terms based on the indication of the amount of textual terms and priorities of the word parts.

15. A computer-program product tangibly embodied in a non-transitory machine-readable storage medium for a graphical user interface that is interactive, the computer-program product including instructions operable to cause a computing system to:
  receive as candidate predictors, for a set of regression models, a list of multiple textual terms, wherein the list of multiple textual terms is for computer identification in one or more datasets, and wherein each of the one or more datasets are associated with different electronic documents comprising text;
  receive initial user selections, in the graphical user interface, of:
    a first set of textual terms comprising multiple candidate predictors from the list of multiple textual terms;
    a response variable for a response, of an initial model for the set of regression models, to input to the initial model, wherein the input comprises one or more members of the first set of textual terms; and
    one or more target values for the response variable;
  generate the initial model that estimates a relationship between the one or more target values and the first set of textual terms;
  display in the graphical user interface:
    a representation of the performance of the initial model for user comparison of models of the set of regression models; and
    an indication of a contribution, to the initial model, of respective textual terms of a subset of the first set of textual terms, wherein the subset of the first set of textual terms is identified in the initial model as predictors of the one or more target values;

receive a subsequent user selection, in the graphical user interface, to change an aspect of the initial model;

generate, based on the subsequent user selection, an updated model for the set of regression models;

display in the graphical user interface an interactive graphical representation summarizing all the documents' contribution to one or more aspects of the initial model;

receive a graph selection of a point in the interactive graphical representation; and in response to the graph selection, display, in the graphical user interface, information pertaining to a subset of the different electronic documents.

16. A computer-program product tangibly embodied in a non-transitory machine-readable storage medium for a graphical user interface that is interactive, the computer-program product including instructions operable to cause a computing system to:

receive as candidate predictors, for a set of regression models, a list of multiple textual terms, wherein the list of multiple textual terms is for computer identification in one or more datasets;

receive initial user selections, in the graphical user interface, of:
 a first set of textual terms comprising multiple candidate predictors from the list of multiple textual terms;
 a response variable for a response, of an initial model for the set of regression models, to input to the initial model, wherein the input comprises one or more members of the first set of textual terms; and
 one or more target values for the response variable;

generate the initial model that estimates a relationship between the one or more target values and the first set of textual terms;

display in the graphical user interface:
 a representation of the performance of the initial model for user comparison of models of the set of regression models; and
 an indication of a contribution, to the initial model, of respective textual terms of a subset of the first set of textual terms, wherein the subset of the first set of textual terms is identified in the initial model as predictors of the one or more target values;

receive a subsequent user selection, in the graphical user interface, to change an aspect of the initial model;

generate, based on the subsequent user selection, an updated model for the set of regression models;

display, in the graphical user interface, one or more term settings, wherein the one or more term settings:
 control a total of textual terms considered from the list of multiple textual terms;
 control a weighting of frequency of textual terms; or
 control both the total of textual terms considered from the list of multiple textual terms and the weighting of frequency of textual terms;

receive the first set of textual terms by receiving a user selection of term settings displayed in the graphical user interface; and receive the subsequent user selection by receiving a user change of the term settings displayed in the graphical user interface.

17. A computer-program product tangibly embodied in a non-transitory machine-readable storage medium for a graphical user interface that is interactive, the computer-program product including instructions operable to cause a computing system to:

receive as candidate predictors, for a set of regression models, a list of multiple textual terms, wherein the list of multiple textual terms is for computer identification in one or more datasets;

receive initial user selections, in the graphical user interface, of:
 a first set of textual terms comprising multiple candidate predictors from the list of multiple textual terms;
 a response variable for a response, of an initial model for the set of regression models, to input to the initial model, wherein the input comprises one or more members of the first set of textual terms; and
 one or more target values for the response variable;

generate the initial model that estimates a relationship between the one or more target values and the first set of textual terms;

display in the graphical user interface:
 a representation of the performance of the initial model for user comparison of models of the set of regression models; and
 an indication of a contribution, to the initial model, of respective textual terms of a subset of the first set of textual terms, wherein the subset of the first set of textual terms is identified in the initial model as predictors of the one or more target values;

receive a subsequent user selection, in the graphical user interface, to change an aspect of the initial model;

generate, based on the subsequent user selection, an updated model for the set of regression models;

display, in the graphical user interface, estimation options for an estimation method for the initial model, wherein the estimation options comprise one or more of:
 a least absolute shrinkage and selection operator (LASSO) estimation method; and
 elastic net regularization estimation method;

receive a selection of an estimation option; and generate the initial model based on the estimation option selected.

18. A computer-program product tangibly embodied in a non-transitory machine-readable storage medium for a graphical user interface that is interactive, the computer-program product including instructions operable to cause a computing system to:

receive as candidate predictors, for a set of regression models, a list of multiple textual terms, wherein the list of multiple textual terms is for computer identification in one or more datasets;

receive initial user selections, in the graphical user interface, of:
 a first set of textual terms comprising multiple candidate predictors from the list of multiple textual terms;
 a response variable for a response, of an initial model for the set of regression models, to input to the initial model, wherein the input comprises one or more members of the first set of textual terms; and
 one or more target values for the response variable;

generate the initial model that estimates a relationship between the one or more target values and the first set of textual terms;

display in the graphical user interface:

a representation of the performance of the initial model for user comparison of models of the set of regression models; and an indication of a contribution, to the initial model, of respective textual terms of a subset of the first set of textual terms, wherein the subset of the first set of textual terms is identified in the initial model as predictors of the one or more target values;

receive a subsequent user selection, in the graphical user interface, to change an aspect of the initial model;

generate, based on the subsequent user selection, an updated model for the set of regression models;

display, in the graphical user interface, validation options for validating the initial model, wherein the validation options comprise one or more of:
 Akaike information criterion (AIC) validation;
 Bayesian information criterion (BIC) validation;
 holdout validation; and
 k-fold validation;

receive an indication of a validation option; and generate the initial model by selecting a given model based on the validation option.

19. A computer-program product tangibly embodied in a non-transitory machine-readable storage medium for a graphical user interface that is interactive, the computer-program product including instructions operable to cause a computing system to:

receive as candidate predictors, for a set of regression models, a list of multiple textual terms, wherein the list of multiple textual terms is for computer identification in one or more datasets;

receive initial user selections, in the graphical user interface, of:
 a first set of textual terms comprising multiple candidate predictors from the list of multiple textual terms;
 a response variable for a response, of an initial model for the set of regression models, to input to the initial model, wherein the input comprises one or more members of the first set of textual terms; and
 one or more target values for the response variable;

generate the initial model that estimates a relationship between the one or more target values and the first set of textual terms;

display in the graphical user interface:
 a representation of the performance of the initial model for user comparison of models of the set of regression models; and
 an indication of a contribution, to the initial model, of respective textual terms of a subset of the first set of textual terms, wherein the subset of the first set of textual terms is identified in the initial model as predictors of the one or more target values;

receive a subsequent user selection, in the graphical user interface, to change an aspect of the initial model;

generate, based on the subsequent user selection, an updated model for the set of regression models;

wherein the graphical user interface displays the indication of the contribution, to the initial model, of respective textual terms by displaying one or more graphical representation of a respective textual term's importance to the initial model; and wherein the one or more graphical representations comprise one or more of:

a word cloud map comprising the subset of the first set of textual terms with the size of textual terms indicating an importance of a respective term to the initial model; and
 a listing of textual terms ranked based on the importance of the respective term to the initial model.

20. A computer-implemented method for a graphical user interface that is interactive comprising:

receiving as candidate predictors, for a set of regression models, a list of multiple textual terms, wherein the list of multiple textual terms is for computer identification in one or more datasets;

receiving initial user selections, in the graphical user interface, of:
 a first set of textual terms comprising multiple candidate predictors from the list of multiple textual terms;
 a response variable for a response, of an initial model for the set of regression models, to input to the initial model, wherein the input comprises one or more members of the first set of textual terms; and
 one or more target values for the response variable;

generating the initial model that estimates a relationship between the one or more target values and the first set of textual terms;

displaying in the graphical user interface:
 a representation of the performance of the initial model for user comparison of models of the set of regression models; and
 an indication of a contribution, to the initial model, of respective textual terms of a subset of the first set of textual terms, wherein the subset of the first set of textual terms is identified in the initial model as predictors of the one or more target values;

receiving a subsequent user selection, in the graphical user interface, to change an aspect of the initial model; and generating, based on the subsequent user selection, an updated model for the set of regression models;

wherein the computer-implemented method further comprises displaying, in the graphical user interface, one or more term settings, wherein the one or more term settings:
 control a total of textual terms considered from the list of multiple textual terms;
 control a weighting of frequency of textual terms; or
 control both the total of textual terms considered from the list of multiple textual terms and the weighting of frequency of textual terms;

wherein the receiving the first set of textual terms comprises receiving a user selection of term settings displayed in the graphical user interface; and wherein the receiving the subsequent user selection comprises receiving a user change of the term settings displayed in the graphical user interface.

21. The computer-implemented method of claim 20, wherein the displaying the graphical user interface comprises displaying by applying:
 a first visual identifier pattern to a first term of the subset of the first set of textual terms indicating a first predictive ability for predicting the one or more target values; and
 a second visual identifier pattern to a second term of the subset of the first set of textual terms indicating a second predictive ability for predicting the one or more target values; and wherein the first visual identifier pattern and the second visual identifier pattern are different to indicate different predictive abilities.

22. The computer-implemented method of claim 20, wherein the displaying the graphical user interface comprises displaying:
   a representation of the performance of the updated model for user comparison of the updated model with the representation of the performance of the initial model, wherein the representation of the performance of the updated model comprises:
      one or more performance metrics,
      one or more graphs, or
      one or more performance metrics and one or more graphs; and
   one or more textual terms of the list of multiple textual terms identified in the updated model as predictors of the one or more target values.

23. The computer-implemented method of claim 20, wherein the receiving a subsequent user selection comprises receiving an indication of a second set of textual terms from the list of multiple textual terms;
   wherein the second set of textual terms comprises at least one term different than the first set of textual terms; and
   wherein the updated model estimates a relationship between the one or more target values and the second set of textual terms.

24. The computer-implemented method of claim 20, wherein the graphical user interface displays an identified phrase or virtual term comprising multiple textual terms from the list of multiple textual terms; and
   wherein the receiving the subsequent user selection comprises receiving an indication to add or remove the identified phrase or virtual term to the list of multiple textual terms.

25. The computer-implemented method of claim 20, wherein each of the one or more datasets are associated with different text-based data sequences; and
   wherein the computer-implemented method further comprises:
      receiving a term selection in the subset displayed in the graphical user interface; and
      in response to the term selection, displaying in the graphical user interface the selected term in a text-based data sequence of the different text-based data sequences.

26. A computer-implemented method for a graphical user interface that is interactive comprising:
   receiving as candidate predictors, for a set of regression models, a list of multiple textual terms, wherein the list of multiple textual terms is for computer identification in one or more datasets;
   receiving initial user selections, in the graphical user interface, of:
      a first set of textual terms comprising multiple candidate predictors from the list of multiple textual terms;
      a response variable for a response, of an initial model for the set of regression models, to input to the initial model, wherein the input comprises one or more members of the first set of textual terms; and
      one or more target values for the response variable;
   generating the initial model that estimates a relationship between the one or more target values and the first set of textual terms;
   displaying in the graphical user interface:
      a representation of the performance of the initial model for user comparison of models of the set of regression models; and
      an indication of a contribution, to the initial model, of respective textual terms of a subset of the first set of textual terms, wherein the subset of the first set of textual terms is identified in the initial model as predictors of the one or more target values;
   receiving a subsequent user selection, in the graphical user interface, to change an aspect of the initial model; and
   generating, based on the subsequent user selection, an updated model for the set of regression models;
   displaying, in the graphical user interface, estimation options for an estimation method for the initial model, wherein the estimation options comprise one or more of:
      a least absolute shrinkage and selection operator (LASSO) estimation method; and
      elastic net regularization estimation method;
   receiving a selection of an estimation option; and
   wherein the generating the initial model comprises generating based on the estimation option selected.

27. A computer-implemented method for a graphical user interface that is interactive comprising:
   receiving as candidate predictors, for a set of regression models, a list of multiple textual terms, wherein the list of multiple textual terms is for computer identification in one or more datasets;
   receiving initial user selections, in the graphical user interface, of:
      a first set of textual terms comprising multiple candidate predictors from the list of multiple textual terms;
      a response variable for a response, of an initial model for the set of regression models, to input to the initial model, wherein the input comprises one or more members of the first set of textual terms; and
      one or more target values for the response variable;
   generating the initial model that estimates a relationship between the one or more target values and the first set of textual terms;
   displaying in the graphical user interface:
      a representation of the performance of the initial model for user comparison of models of the set of regression models; and
      an indication of a contribution, to the initial model, of respective textual terms of a subset of the first set of textual terms, wherein the subset of the first set of textual terms is identified in the initial model as predictors of the one or more target values;
   receiving a subsequent user selection, in the graphical user interface, to change an aspect of the initial model; and
   generating, based on the subsequent user selection, an updated model for the set of regression models;
   displaying, in the graphical user interface, validation options for validating the initial model, wherein the validation options comprise one or more of:
      Akaike information criterion (AIC) validation;
      Bayesian information criterion (BIC) validation;
      holdout validation; and
      k-fold validation;
   receiving an indication of a validation option; and
   wherein the generating the initial model comprises selecting a given model based on the validation option.

28. A computing system for a graphical user interface that is interactive, the computing system comprising processor and memory, the memory containing instructions executable by the processor wherein the computing system is configured to:
- receive as candidate predictors, for a set of regression models, a list of multiple textual terms, wherein the list of multiple textual terms is for computer identification in one or more datasets, and wherein each of the one or more datasets are associated with different electronic documents comprising text;
- receive initial user selections, in the graphical user interface, of:
  - a first set of textual terms comprising multiple candidate predictors from the list of multiple textual terms;
  - a response variable for a response, of an initial model for the set of regression models, to input to the initial model, wherein the input comprises one or more members of the first set of textual terms; and
  - one or more target values for the response variable;
- generate the initial model that estimates a relationship between the one or more target values and the first set of textual terms;
- display in the graphical user interface:
  - a representation of the performance of the initial model for user comparison of models of the set of regression models; and
  - an indication of a contribution, to the initial model, of respective textual terms of a subset of the first set of textual terms, wherein the subset of the first set of textual terms is identified in the initial model as predictors of the one or more target values;
- receive a subsequent user selection, in the graphical user interface, to change an aspect of the initial model;
- generate, based on the subsequent user selection, an updated model for the set of regression models;
- display, in the graphical user interface, an indication of an identified document of the different electronic documents and the identified document's contribution to the one or more target values;
- receive a document selection of the identified document displayed in the graphical user interface; and
- in response to the document selection of the identified document, display, in the graphical user interface, text in the identified document comprising an indication of a contribution of one or more textual terms of the text to the one or more target values.

* * * * *

UNITED STATES PATENT AND TRADEMARK OFFICE
CERTIFICATE OF CORRECTION

| | | |
|---|---|---|
| PATENT NO. | : 11,334,809 B1 | |
| APPLICATION NO. | : 17/341580 | |
| DATED | : May 17, 2022 | |
| INVENTOR(S) | : Ernest C. Pasour, Clayton A. Barker and Paris A. Faison | |

It is certified that error appears in the above-identified patent and that said Letters Patent is hereby corrected as shown below:

In the Drawings

Delete Figure 3, substitute therefor the replacement sheets for Figure 3, as shown on the attached page.

In the Specification

Column 7, Line 10, delete "remote server 140", and insert --a remote server--, therefor.

Column 7, Line 16, delete "system 150,", and insert --system,--, therefor.

Column 7, Line 33, delete "network 114,", and insert --network 108,--, therefor.

Column 11, Line 1, delete "314 (or computing", and insert --320 (or computing--, therefor.

Column 11, Line 11, delete "raw bites", and insert --raw bytes--, therefor.

Column 12, Line 1, delete "computing enviroment 314", and insert --computing environment 320--, therefor.

Column 12, Line 4, delete "314 can interact", and insert --320 can interact--, therefor.

Column 12, Line 8, delete "computing environment 314", and insert --computing environment 320--, therefor.

Column 12, Line 10, delete "environment 314", and insert --environment 320--, therefor.

Column 12, Line 12, delete "computing environment 314", and insert --computing environment 320--, therefor.

Signed and Sealed this
Tenth Day of September, 2024

*Katherine Kelly Vidal*

Katherine Kelly Vidal
*Director of the United States Patent and Trademark Office*

CERTIFICATE OF CORRECTION (continued)
U.S. Pat. No. 11,334,809 B1

Column 12, Line 14, delete "computing enviroment 314", and insert --computing environment 320--, therefor.

Column 12, Line 18, delete "314 can communicate", and insert --320 can communicate--, therefor.

Column 12, Line 21, delete "computing environment 314", and insert --computing environment 320--, therefor.

Column 12, Line 30, delete "computing environment 314", and insert --computing environment 320--, therefor.

Column 13, Line 34, delete "may be receive", and insert --may be received--, therefor.

Column 14, Line 33, delete "grid nodes).", and insert --grid nodes.--, therefor.

Column 16, Line 53, delete "flow chart", and insert --flow chart 500--, therefor.

Column 18, Line 18, delete "DMBS 628", and insert --DBMS 628--, therefor.

Column 18, Line 27, delete "and 620", and insert --and 610--, therefor.

Column 18, Line 29, delete "and 620", and insert --and 610--, therefor.

Column 18, Line 44, delete "DMBS 628", and insert --DBMS 628--, therefor.

Column 18, Line 47, delete "DMBS 628", and insert --DBMS 628--, therefor.

Column 18, Line 63, delete "flow chart", and insert --flow chart 700--, therefor.

Column 35, Line 6, delete "BIC=k ln(n)-2 ln(", and insert --BIC=kln(n)-2ln(--, therefor.

Column 35, Line 7, delete "AIC=2k-2 ln(", and insert --AIC=2k-2ln(--, therefor.